(12) United States Patent
Zhang et al.

(10) Patent No.: US 12,127,198 B2
(45) Date of Patent: Oct. 22, 2024

(54) TECHNIQUES FOR SIDELINK FULL-DUPLEX SEMI-STATIC TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Jelena Damnjanovic, Del Mar, CA (US); Sony Akkarakaran, Poway, CA (US); Navid Abedini, Basking Ridge, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 514 days.

(21) Appl. No.: 17/477,328

(22) Filed: Sep. 16, 2021

(65) Prior Publication Data
US 2023/0081233 A1 Mar. 16, 2023

(51) Int. Cl.
*H04W 72/20* (2023.01)
*H04L 5/14* (2006.01)
*H04W 72/044* (2023.01)

(52) U.S. Cl.
CPC .............. *H04W 72/20* (2023.01); *H04L 5/14* (2013.01); *H04W 72/046* (2013.01)

(58) Field of Classification Search
CPC ........ H04W 72/20; H04W 72/046; H04L 5/14
See application file for complete search history.

(56) References Cited

U.S. PATENT DOCUMENTS

| | | | | |
|---|---|---|---|---|
| 2019/0320461 | A1* | 10/2019 | Wu | H04W 72/046 |
| 2020/0163005 | A1* | 5/2020 | Rao | H04W 76/27 |
| 2020/0396716 | A1* | 12/2020 | Li | H04W 72/0446 |
| 2021/0243554 | A1* | 8/2021 | Wu | H04W 72/51 |
| 2023/0363049 | A1* | 11/2023 | Luo | H04W 76/14 |

FOREIGN PATENT DOCUMENTS

| | | |
|---|---|---|
| WO | WO-2019160773 A1 | 8/2019 |
| WO | WO-2020172576 A1 | 8/2020 |
| WO | WO-2021168767 A1 | 9/2021 |

OTHER PUBLICATIONS

International Search Report and Written Opinion—PCT/US2022/075079—ISA/EPO—Dec. 5, 2022 (2105033WO).

* cited by examiner

*Primary Examiner* — Jasper Kwoh
(74) *Attorney, Agent, or Firm* — Arun Swain

(57) ABSTRACT

Methods, systems, and devices for wireless communication at a user equipment (UE) are described. A first user equipment (UE) may transmit, to a set of UEs, an indication of a first semi-static traffic pattern between the first UE and a second UE. In some examples, the first semi-static traffic pattern may indicate a pattern for transmission or reception between the first UE and the second UE using a beam pair during a time period. The first UE may receive a response, from one or more UEs, indicating one or more semi-static traffic patterns for the time period. The first UE may then transmit, to a third UE of the one or more UEs, an indication of selection of a second semi-static traffic pattern for communication between the first UE and the third UE during the time period.

28 Claims, 12 Drawing Sheets

TECHNIQUES FOR SIDELINK FULL-DUPLEX SEMI-STATIC TRANSMISSIONS

FIELD OF TECHNOLOGY

The following relates to wireless communication at a user equipment (UE), including techniques for sidelink full-duplex semi-static transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support UEs or base stations that are capable of full duplex communications (e.g., simultaneously transmitting and receiving). As such, techniques for full-duplex communications may be improved to enhance communications efficiency in full duplex communications devices.

SUMMARY

The described techniques relate to improved methods, systems, devices, and apparatuses that support techniques for sidelink full-duplex semi-static transmissions. Generally, the described techniques provide for configuring full duplex communications in wireless communications systems supporting sidelink communications. In some aspects, a user equipment (UE) may support full-duplex communications. To coordinate semi-static sidelink transmissions with neighboring UEs, a first UE capable of performing full-duplex communications may broadcast or multicast a message that includes an indication of a first semi-static traffic pattern indicating a pattern for transmission or reception between the first UE and a second UE. One or more neighboring UEs may receive the indication of the first semi-static traffic pattern and may respond with messages that includes indications of one or more semi-static traffic patterns that are capable of coordinating with the first semi-static traffic pattern during a first time period. The neighboring UEs may also report assistance information to the first UE. The first UE may use the semi-static traffic patterns and the assistance information to select to communicate with at least one of the neighboring UEs (e.g., a third UE) using at least one of the one or more semi-static traffic patterns. The first UE may then transmit an indication of selection to the third UE. During an upcoming time period, the first UE may simultaneously communicate with the second UE and the third UE using the first semi-static traffic pattern and the at least one of the one or more semi-static traffic patterns.

A method for wireless communications at a first UE is described. The method may include transmitting, to a set of UEs, an indication of a first semi-static traffic pattern between the first UE and a second UE, where the first semi-static traffic pattern indicates a pattern for transmission or reception between the first UE and the second UE using a beam pair during a time period, receiving, from one or more UEs of the set of UEs, a response indicating one or more semi-static traffic patterns for the time period, the one or more semi-static traffic patterns corresponding to the first semi-static traffic pattern during the time period, and transmitting, to a third UE of the one or more UEs, an indication of selection of a second semi-static traffic pattern for communication between the first UE and the third UE during the time period.

An apparatus for wireless communications at a first UE is described. The apparatus may include a processor, memory coupled with the processor, and instructions stored in the memory. The instructions may be executable by the processor to cause the apparatus to transmit, to a set of UEs, an indication of a first semi-static traffic pattern between the first UE and a second UE, where the first semi-static traffic pattern indicates a pattern for transmission or reception between the first UE and the second UE using a beam pair during a time period, receive, from one or more UEs of the set of UEs, a response indicating one or more semi-static traffic patterns for the time period, the one or more semi-static traffic patterns corresponding to the first semi-static traffic pattern during the time period, and transmit, to a third UE of the one or more UEs, an indication of selection of a second semi-static traffic pattern for communication between the first UE and the third UE during the time period.

Another apparatus for wireless communications at a first UE is described. The apparatus may include means for transmitting, to a set of UEs, an indication of a first semi-static traffic pattern between the first UE and a second UE, where the first semi-static traffic pattern indicates a pattern for transmission or reception between the first UE and the second UE using a beam pair during a time period, means for receiving, from one or more UEs of the set of UEs, a response indicating one or more semi-static traffic patterns for the time period, the one or more semi-static traffic patterns corresponding to the first semi-static traffic pattern during the time period, and means for transmitting, to a third UE of the one or more UEs, an indication of selection of a second semi-static traffic pattern for communication between the first UE and the third UE during the time period.

A non-transitory computer-readable medium storing code for wireless communications at a first UE is described. The code may include instructions executable by a processor to transmit, to a set of UEs, an indication of a first semi-static traffic pattern between the first UE and a second UE, where the first semi-static traffic pattern indicates a pattern for transmission or reception between the first UE and the second UE using a beam pair during a time period, receive, from one or more UEs of the set of UEs, a response indicating one or more semi-static traffic patterns for the time period, the one or more semi-static traffic patterns corresponding to the first semi-static traffic pattern during the time period, and transmit, to a third UE of the one or more UEs, an indication of selection of a second semi-static traffic pattern for communication between the first UE and the third UE during the time period.

In some examples of the method, apparatuses, and non-transitory computer-readable medium described herein, transmitting the indication of the first semi-static traffic pattern may include operations, features, means, or instructions for broadcasting, to the set of UEs, the indication of the first semi-static traffic pattern between the first UE and the second UE. In some examples of the method, apparatuses, and non-transitory computer-readable medium described herein, transmitting the indication of the first semi-static traffic pattern may include operations, features, means, or instructions for multicasting, to the set of UEs, the indication of the first semi-static traffic pattern between the first UE and the second UE.

Some examples of the method, apparatuses, and non-transitory computer-readable medium described herein may further include operations, features, means, or instructions for communicating, during the time period, with the second UE according to the first semi-static traffic pattern and the third UE according to the second semi-static traffic pattern based on transmitting the indication of selection of the second semi-static traffic pattern.

In some examples of the method, apparatuses, and non-transitory computer-readable medium described herein, receiving the response may include operations, features, means, or instructions for receiving, from the third UE, the response indicating the second semi-static traffic pattern corresponding to the first semi-static traffic pattern during the time period and receiving, from a fourth UE, the response indicating a third semi-static traffic pattern for the time period corresponding to the first semi-static traffic pattern during the time period.

Some examples of the method, apparatuses, and non-transitory computer-readable medium described herein may further include operations, features, means, or instructions for selecting the second semi-static traffic pattern associated with the third UE based on the second semi-static traffic pattern and the third semi-static traffic pattern, where transmitting the indication may be based on selecting the second semi-static traffic pattern.

Some examples of the method, apparatuses, and non-transitory computer-readable medium described herein may further include operations, features, means, or instructions for receiving, from the one or more UEs of the set of UEs, assistance information associated with the one or more semi-static traffic patterns for the time period, where transmitting the indication of selection of the second semi-static traffic pattern may be based on the assistance information.

In some examples of the method, apparatuses, and non-transitory computer-readable medium described herein, the assistance information includes at least one of a traffic periodicity, a traffic priority, a beam identifier associated with a second beam pair, a quality metric associated with the second beam pair, or a combination thereof. In some examples of the method, apparatuses, and non-transitory computer-readable medium described herein, receiving the response may include operations, features, means, or instructions for receiving, from the third UE, the response indicating the second semi-static traffic pattern corresponding to the first semi-static traffic pattern during a first portion of the time period and receiving, from a fourth UE, the response indicating a third semi-static traffic pattern corresponding to the first semi-static traffic pattern during a second portion of the time period.

Some examples of the method, apparatuses, and non-transitory computer-readable medium described herein may further include operations, features, means, or instructions for selecting the second semi-static traffic pattern associated with the third UE for the first portion of the time period based on the second semi-static traffic pattern, where transmitting the indication may be based on selecting the second semi-static traffic pattern and selecting the third semi-static traffic pattern associated with the fourth UE for the second portion of the time period based on the third semi-static traffic pattern.

Some examples of the method, apparatuses, and non-transitory computer-readable medium described herein may further include operations, features, means, or instructions for transmitting, to the fourth UE of the one or more UEs, a second indication of selection of the third semi-static traffic pattern between the first UE and the fourth UE for communicating during the second portion of the time period.

Some examples of the method, apparatuses, and non-transitory computer-readable medium described herein may further include operations, features, means, or instructions for communicating, during the second portion of the time period, with the second UE according to the second semi-static traffic pattern and the fourth UE according to the third semi-static traffic pattern based on transmitting the second indication of selection of the third semi-static traffic pattern. In some examples of the method, apparatuses, and non-transitory computer-readable medium described herein, the second semi-static traffic pattern and the third semi-static traffic pattern may be associated with different periodicities.

Some examples of the method, apparatuses, and non-transitory computer-readable medium described herein may further include operations, features, means, or instructions for determining a cancellation of a transmission during a subset of the first semi-static traffic pattern and transmitting, to the third UE of the one or more UEs, a second indication of adjusted parameters associated with the second semi-static traffic pattern based on determining the cancellation of the transmission.

In some examples of the method, apparatuses, and non-transitory computer-readable medium described herein, the adjusted parameters include at least one of a beam, a modulation and coding scheme, a transmit power, a rank indicator, a precoder, or a combination thereof. In some examples of the method, apparatuses, and non-transitory computer-readable medium described herein, the first UE includes a full-duplex capable UE and the communication between the first UE and the third UE includes a full-duplex communication.

A method for wireless communications is described. The method may include receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period, transmitting, to the first UE, a response indicating a second semi-static traffic pattern corresponding to the first semi-static traffic pattern during the time period, and receiving, from the first UE, an indication of selection of the second semi-static traffic pattern for communication between the first UE and the third UE during the time period.

An apparatus for wireless communications is described. The apparatus may include a processor, memory coupled with the processor, and instructions stored in the memory. The instructions may be executable by the processor to cause the apparatus to receive, from a first UE and at a third UE, an indication of a first semi-static traffic pattern between the first UE and a second UE, where the first semi-static traffic pattern indicates a pattern for transmission or reception between the first UE and the second UE using a beam pair during a time period, transmit, to the first UE, a response indicating a second semi-static traffic pattern corresponding to the first semi-static traffic pattern during the time period, and receive, from the first UE, an indication of selection of the second semi-static traffic pattern for communication between the first UE and the third UE during the time period.

Another apparatus for wireless communications is described. The apparatus may include means for receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period, means for transmitting, to the first UE, a response indicating a second semi-static traffic pattern corresponding to the first semi-static traffic pattern during the time period, and means for receiving, from the first UE, an indication of selection of the second semi-static traffic pattern for communication between the first UE and the third UE during the time period.

A non-transitory computer-readable medium storing code for wireless communications is described. The code may include instructions executable by a processor to receive, from a first UE and at a third UE, an indication of a first semi-static traffic pattern between the first UE and a second UE, where the first semi-static traffic pattern indicates a pattern for transmission or reception between the first UE and the second UE using a beam pair during a time period, transmit, to the first UE, a response indicating a second semi-static traffic pattern corresponding to the first semi-static traffic pattern during the time period, and receive, from the first UE, an indication of selection of the second semi-static traffic pattern for communication between the first UE and the third UE during the time period.

In some examples of the method, apparatuses, and non-transitory computer-readable medium described herein, receiving the indication of the first semi-static traffic pattern may include operations, features, means, or instructions for receiving a broadcast of the indication of the first semi-static traffic pattern between the first UE and the second UE. In some examples of the method, apparatuses, and non-transitory computer-readable medium described herein, receiving the indication of the first semi-static traffic pattern may include operations, features, means, or instructions for receiving a multicast of the indication of the first semi-static traffic pattern between the first UE and the second UE.

Some examples of the method, apparatuses, and non-transitory computer-readable medium described herein may further include operations, features, means, or instructions for communicating, during the time period, with the first UE according to the second semi-static traffic pattern based on receiving the indication of selection of the second semi-static traffic pattern. Some examples of the method, apparatuses, and non-transitory computer-readable medium described herein may further include operations, features, means, or instructions for transmitting, to the first UE, assistance information associated with the second semi-static traffic pattern for the time period, where receiving the indication of selection of the second semi-static traffic pattern may be based on the assistance information.

In some examples of the method, apparatuses, and non-transitory computer-readable medium described herein, the assistance information includes at least one of a traffic periodicity, a traffic priority, a beam identifier associated with a second beam pair, a quality metric associated with the second beam pair, or a combination thereof. In some examples of the method, apparatuses, and non-transitory computer-readable medium described herein, transmitting the response may include operations, features, means, or instructions for transmitting, to the first UE, the response indicating the second semi-static traffic pattern corresponding to the first semi-static traffic pattern during a first portion of the time period.

Some examples of the method, apparatuses, and non-transitory computer-readable medium described herein may further include operations, features, means, or instructions for receiving, from the first UE, a second indication of adjusted parameters associated with the second semi-static traffic pattern based on a cancellation of a transmission during a subset of the first semi-static traffic pattern.

In some examples of the method, apparatuses, and non-transitory computer-readable medium described herein, the adjusted parameters include at least one of a beam, a modulation and coding scheme, a transmit power, a rank indicator, a precoder, or a combination thereof. In some examples of the method, apparatuses, and non-transitory computer-readable medium described herein, the first UE includes a full-duplex capable UE and the communication between the first UE and the third UE includes a full-duplex communication.

DETAILED DESCRIPTION

Figure 1:
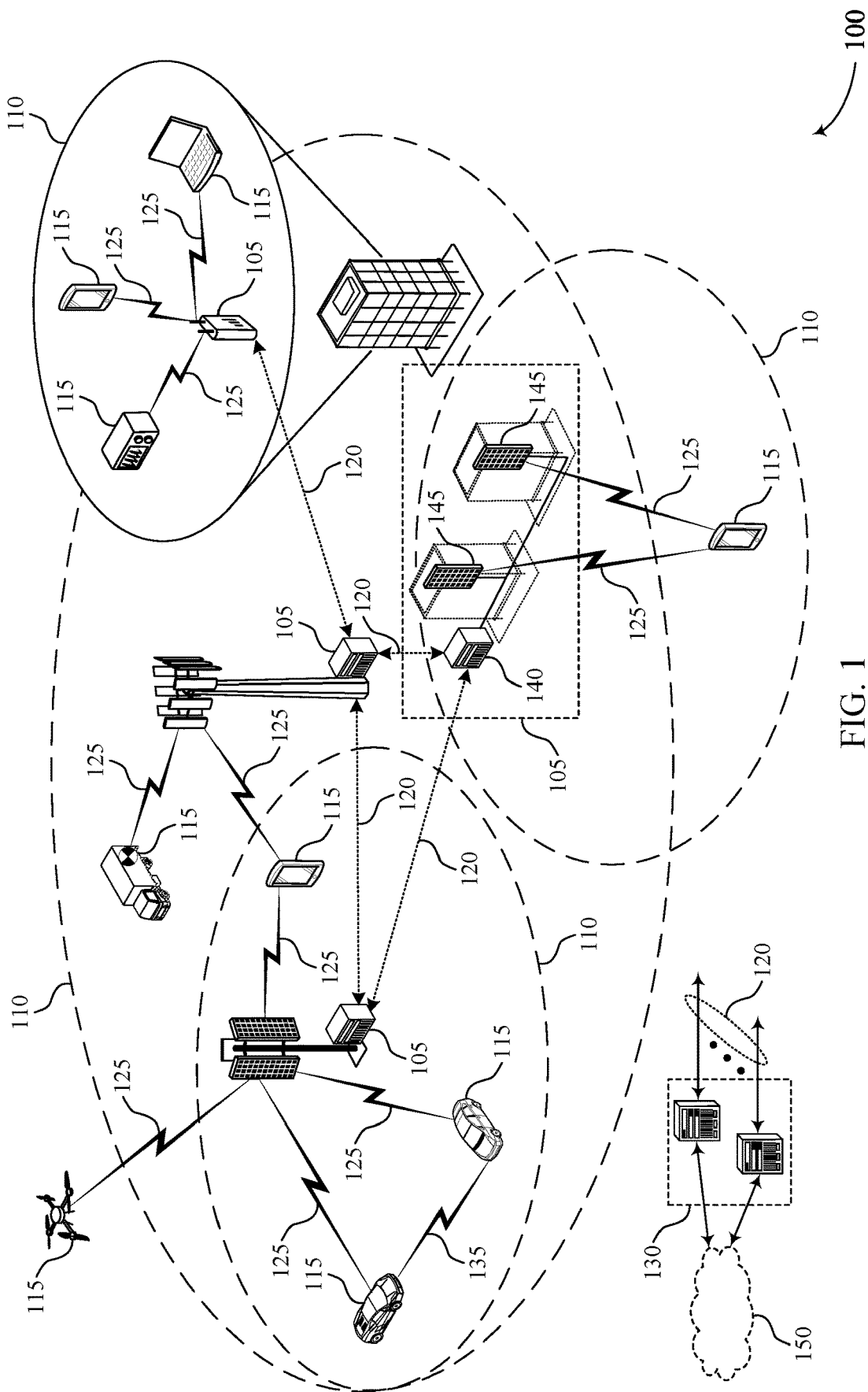
FIG. 1 illustrates an example of a wireless communications system that supports techniques for sidelink full-duplex semi-static transmissions in accordance with aspects of the present disclosure.

A wireless communications system may support both access links and sidelinks for communications between one or more communication devices. An access link may refer to a communication link between a UE and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. Sidelink communications may support communications within a group of UEs. For example, sidelink communications may include communications between a UE and one or more other UEs within a coverage area. In some examples, sidelink communications may support two modes of resource allocation mechanism. In a first mode of operation (e.g., Mode 1) for sidelink communications, resources may be scheduled by a base station. In a second mode of operation (e.g., Mode 2) for sidelink communications, base stations may not be involved in sidelink communications and a UE may perform autonomous resource selection. For example, a UE may reserve a set of resources without a base station allocating resources to UEs participating in sidelink communications.

Some wireless communications systems may also support full-duplex communications by various wireless communications devices in the wireless communications system. For example, both UEs and base stations may be capable of simultaneous transmission and reception. As such, radio frequency spectrum bands may be configured to support full-duplex communications, where a node of a wireless communication system can both send and receive information at the same time (e.g., or information can flow in directions at the same time). A full-duplex capable UE may support simultaneous downlink and uplink communication over an access link. However, UEs may not be capable of coordinating on full-duplex communications during Mode 2 communication in a sidelink network (without a base station or a central control controlling the transmissions for a UE).

Aspects of the present disclosure provide for a full-duplex UE to coordinate semi-static sidelink transmissions with neighboring UEs. A first UE capable of performing full-duplex communications may transmit an indication of a first semi-static traffic pattern between the first UE and a second UE. The first UE may broadcast or multicast the indication of the first semi-static traffic pattern with associated candidate beam pairs of the first UE. The first semi-static traffic pattern may indicate a pattern for transmission or reception between the first UE and the second UE using a beam pair during a time period. One or more neighboring UEs may receive the indication of the first semi-static traffic pattern and may search for one or more full-duplex transmission opportunities. In some examples, the one or more neighboring UEs may respond (to the first UE) with one or more indication of one or more semi-static traffic patterns that may be configured to coordinate with the first semi-static traffic pattern. The neighboring UEs may also report assistance information to the first UE. The first UE may use the semi-static traffic patterns and the assistance information to select to communicate with at least one of the neighboring UEs (e.g., a third UE) using at least one of the one or more semi-static traffic patterns that are configured to coordinate with the first semi-static traffic pattern. The first UE may then transmit an indication of selection to the third UE. During an upcoming time period, the first UE may simultaneously communicate with the second UE and the third UE using the respective semi-static traffic patterns.

UEs supporting signaling for sidelink full-duplex semi-static transmissions may utilize the techniques described herein to experience power savings and extended battery life while ensuring reliable and efficient communications in the group of UEs. Particular aspects of the subject matter described in this disclosure may be implemented to support high reliability and low latency communications, among other examples. For example, UEs may implement full-duplex communications in sidelink to improve to power consumption while achieving spectral efficiency, higher data rates and, efficiency for high reliability and low latency operations, among other benefits.

Aspects of the disclosure are initially described in the context of wireless communications systems. Aspects of the disclosure are further described in the context of process flow and semi-static transmission procedures. Aspects of the disclosure are further illustrated by and described with reference to apparatus diagrams, system diagrams, and flowcharts that relate to techniques for sidelink full-duplex semi-static transmissions.

FIG. 1 illustrates an example of a wireless communications system 100 that supports techniques for sidelink full-duplex semi-static transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, UEs 115 performing sidelink communication may further perform full-duplex semi-static transmissions. In some examples, a first UE 115 may be a full-duplex capable UE. The first UE 115 may communicate with a second UE 115 according to a first semi-static traffic pattern. The first semi-static traffic pattern may indicate a pattern for transmission or reception between the first UE 115 and the second UE 115 using a beam pair during a time period. The first UE 115 may transmit (either broadcast or multicast), to a set of UEs 115, an indication of a first semi-static traffic pattern between the first UE 115 and the second UE 115. The set of UEs 115 may be or include a set of neighboring UEs 115. One or more of the neighboring UEs 115 may receive the indication of the first semi-static traffic pattern between the first UE 115 and the second UE 115, and may transmit a response. The first UE 115 may receive, from the one or more neighboring UEs 115, a response indicating one or more semi-static traffic patterns for the time period. In some examples, the one or more semi-static traffic patterns may correspond to the first semi-static traffic pattern during the time period. The first UE 115 may receive the response indicating a second semi-static traffic pattern from a third UE 115. Additionally, the first UE 115 may receive the response indicating a third semi-static traffic pattern from a fourth UE 115. The first UE 115 may then select the second semi-static traffic pattern associated with the third UE 115 based on the second semi-static traffic pattern and the third semi-static traffic pattern. In some examples, the neighboring UEs 115 may additionally provide assistance information used by the first UE 115 in selecting a neighboring UE 115. The first UE 115 may then transmit, to the third UE 115 of the one or more neighboring UEs 115, an indication of selection of a second semi-static traffic pattern for communication between the first UE 115 and the third UE 115 during the time period.

Figure 2:
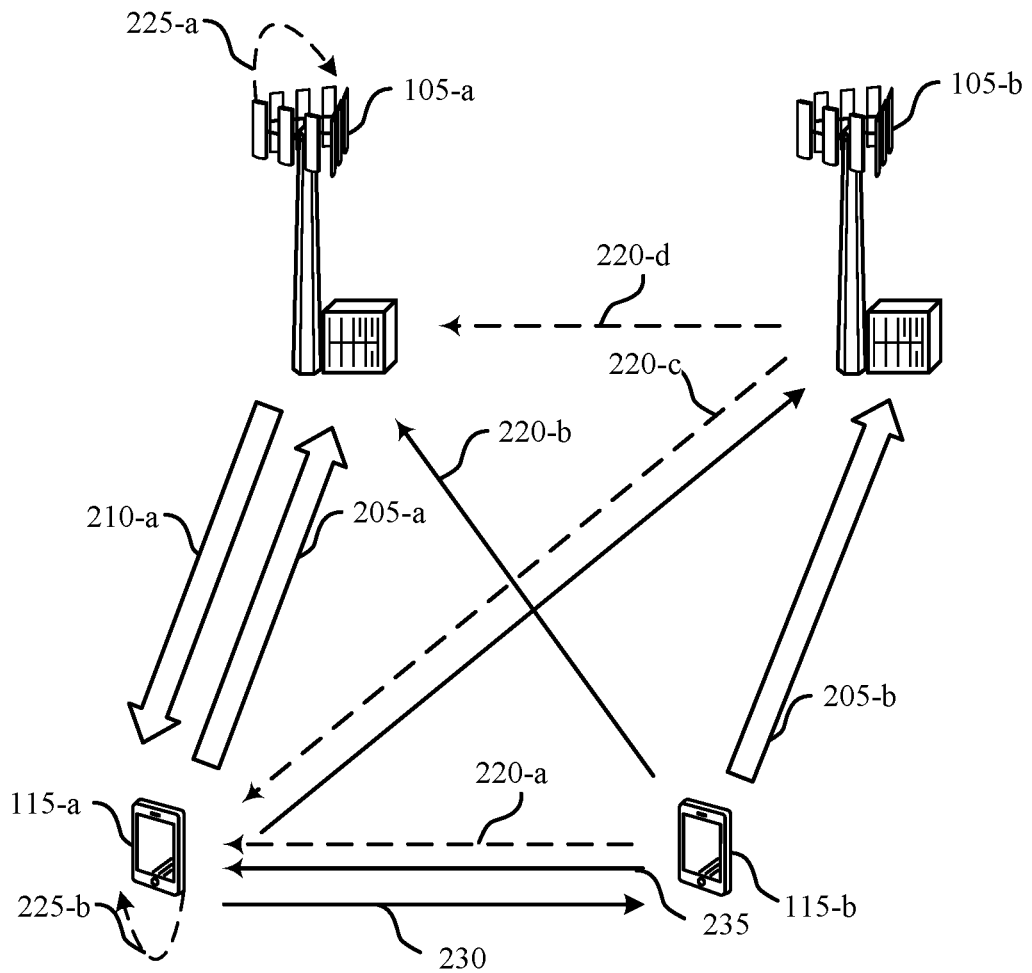
FIG. 2 illustrates an example of a wireless communications system that supports techniques for sidelink full-duplex semi-static transmissions in accordance with aspects of the present disclosure.

FIG. 2 illustrates an example of a wireless communications system 200 that supports techniques for sidelink full-duplex semi-static transmissions in accordance with aspects of the present disclosure. In some examples, the wireless communications system 200 may implement aspects of wireless communications system 100. The wireless communications system 200 may include a UE 115-a, a UE 115-b, a base station 105-a, and a base station 105-b, which may be examples of the corresponding devices described with reference to FIG. 1. In some cases, the wireless communications system 200 (e.g., a 5G or an NR system) may support enhancements for full-duplex communications or a combination of full-duplex and half-duplex communications at both ends of a communication link (e.g., for both a UE 115 and a base station 105).

The wireless communications system 200 may support both access links and sidelinks for communications between one or more communication devices (e.g., UEs 115 and base stations 105). An access link may refer to a communication link between a UE 115 (such as, UE 115-a and UE 115-b) and a base station (such as, base station 105-a and base station 105-b). A sidelink may refer to any communication link between similar wireless devices (for example, a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

The base station 105-a or the base station 105-b or both may communicate with one or more UEs 115 (for example, UEs 115-a and UE 115-b), which may be included within a UE group (not shown). For example, the base station 105-a may transmit a control signal (via communication link 210-a) to the UE 115-a (UE 1). In some examples, the UE 115-a and the UE 115-b may communicate with each other (or with another group of UEs 115) over sidelink communications (for example, using a peer-to-peer (P2P) or D2D protocol). In some examples, the UE 115-a may transmit sidelink transmissions to the UE 115-b. In some examples, the UE 115-a or the UE 115-b may monitor resource pools for the sidelink communications or indications of the sidelink communications (for example, resource reservations, control channel transmissions, among other examples) from other UEs 115 in the group. Additionally or alternatively, the UEs 115 may have data to transmit to (or receive from) another UE 115 and may use the sidelink communications to transmit the data transmission. In some examples, the UEs 115 may utilize sidelinks communications in addition to access links with the base station 105-a or the base station 105-b or both.

As depicted herein, sidelink communications may support communications within a group of UEs 115. For instance, sidelink communications may include communications between a UE (such as, UE 115-a) and another UE (such as, UE 115-b) within a coverage area (for example, a coverage area provided by a base station, a coverage area outside of the coverage area provided by the base station, or a combination thereof). A UE 115 may initiate sidelink communications with other UEs. For example, the UE 115-a may be in a coverage area (for example, a coverage area 110 with reference to FIG. 1) of the base station 105-a. In such examples, a UE 115-a may communicate with the base station 105-a via a Uu interface (for example, the base station 105-a may transmit downlink communications to the UE 115-a via an access link).

In some examples, the UE 115 (such as, UE 115-a and UE 115-b) may have information (for example, a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE. In some examples, the wireless communications system 200 may support two modes of resource allocation mechanism: Mode 1 (in which the resource is scheduled by a base station) and Mode 2 (in which the UE performs an autonomous resource selection). In the example of Mode 2 operation, each transmitting UE may perform a sensing operation to find occupied or available resources for transmission. For example, devices (receivers and transmitters) may perform a sensing operation before transmitting. In the example of Mode 2 operation, a transmitter device (for example, UE 115-a or UE 1) may schedule resources for receiver devices (for example, UE 115-b or UE 2). In particular, each transmitting UE (for example, UE 115-a or UE 1) may perform a sensing operation to find occupied or available resources for its own transmission. In wireless communications system 200, the communications devices (UEs and base stations may support full-duplex communication).

Full-duplex may refer to simultaneous data transmission and receptions over one channel. A full-duplex device (e.g., a full-duplex UE or a full-duplex base station) may be capable of bi-directional transmissions at the same time while half-duplex devices may be capable of transmitting in one direction at one time. Some wireless communications systems may support full-duplex communications, in which some UEs 115 may support full-duplex communications while other UEs 115 may support half duplex communications. Full-duplex communication in sidelink may reduce blocking that may be associated with half-duplex constraints. For example, UEs 115 supporting full-duplex communications may eliminate the need for two blind transmissions when communicating with each other. Additionally or alternatively, full-duplex communications may support efficient UE-to-base station and UE-to-UE relaying, and simultaneous sidelink transmission and sensing in Mode 2 operation. Full-duplex in sidelink communication may also provide for enhanced inter-UE coordination. Full-duplex communication may include in-band full-duplex communication and sub-band full-duplex communication. During the in-band full-duplex communication, the UE 115 may transmit and receive during the same time and/or frequency resource. During the in-band full-duplex communication, the downlink and uplink may share common in-band full-duplex communication time and frequency resources. In some cases, the downlink and uplink resources may fully or partially overlap (e.g., be transmitted in the same frequency band) in the in-band full-duplex communication. During the sub-band full-duplex communication, the UE 115 may transmit and receive at the same time on different frequency resources (for example, the downlink resource may be separated from the uplink resource in the frequency domain).

In some examples, the UE 115-a or the UE 115-b or both may identify that the UE 115-a or the UE 115-b or both may support in-band full-duplex or sub-band full-duplex (e.g., flexible duplex), or both, over communication link 205. A UE (such as UE 115-a and UE 115-b) and a base station (such as base station 105-a and base station 105-b) may support an in-band full-duplex. In some examples, the UE 115-a or the UE 115-b or both may communicate with the base station 105-a or the base station 105-b or both, where the UEs are full-duplex and the base stations are half-duplex. Additionally or alternatively, the UE 115-a or the UE 115-b or both may communicate with the base station 105-a or the base station 105-b or both, where the UEs and the base stations are half-duplex. Additionally or alternatively, the UE 115-*a* or the UE 115-*b* or both may communicate with the base station 105-*a* or the base station 105-*b* or both, where the UEs and the base stations are full-duplex.

As depicted in the example of FIG. 2, the UE 115-*a* and the base station 105-*a* may support full-duplex communications over communication link 205. While transmitting and receiving signals using full-duplex communications, the UE 115-*a* or the base station 105-*a*, or both, may experience self-interference (e.g., self-interference 225-*a* and self-interference 225-*b*) due to transmitting and receiving signals. In some examples, the UE 115-*a* or the base station 105-*a*, or both, may experience self-interference 225 due to communicating using spatially proximate antenna arrays (e.g., from downlink to uplink or from uplink to downlink). For instance, the UE 115-*a* may transmit a signal to the base station 105-*a* on uplink communication link 205-*a* via a transmit antenna array while simultaneously receiving a signal from the base station 105-*a* on downlink communication link 210-*a* via a receive antenna array. In cases when the transmit antenna array is spatially proximate to the receive antenna array, the UE 115-*a* may experience interference at the receive antenna array from transmissions via the transmit antenna array. In particular, the UE 115-*a* may experience interference on its receive antennas from its own uplink transmissions (e.g., while simultaneously transmitting in the uplink and receiving in the downlink).

In some examples, the UE 115-*a* may experience cross-link interference from the uplink transmissions of a nearby or neighboring UE 115 (e.g., uplink transmissions by UE 115-*b* over communication link 205-*b* may cause interfering signals (such as over communication link 220-*a*)). In some examples, the UE 115-*a* may experience cross-link interference over communication link 220-*c* and the base station 105-*a* may experience cross-link interference over communication link 220-*b*. The base station 105-*a* may experience self-interference for similar reasons. For instance, the base station 105-*a* may experience self-interference when receiving uplink communications from one or more UEs 115 (e.g., including UEs 115-*a* and 115-*b*) while simultaneously communicating on the downlink to the UE 115-*a*, where the downlink signaling may generate the self-interference on the reception on the uplink at base station 105-*a*. Additionally, the base station 105-*a* may experience cross-link interference from the base station 105-*b* (e.g., over communication link 220-*d*).

Additionally or alternatively, similar conditions may apply to the UE 115-*b* and the base station 105-*b* over communication link 210 based on simultaneously communicating via uplink communication link 205-*b* and downlink communication link 210-*b*. In some examples, full-duplex capability may be conditional on beam separation. Full-duplex communications may provide for latency reduction (because it may be possible to receive downlink signal in uplink slots, which may enable latency savings, spectrum efficiency enhancement per cell, spectrum efficiency enhancement per UE, and more efficient resource utilization. Thus, a full-duplex UE may support simultaneous downlink and uplink communication. However, UEs 115 may not be capable of coordinating on full-duplex communications during Mode 2 communication (without a base station 105 or a central control controlling the transmissions for a UE 115).

As described herein, the UE 115-*a*, the UE 115-*b*, the base station 105-*a* and the base station 105-*b* may implement methods that may provide for a full-duplex UE to coordinate semi-static sidelink transmissions with neighboring UEs. A first UE 115-*a* capable of full-duplex communications may transmit an indication (via sidelink communication link 230) of a first semi-static traffic pattern between the first UE and a second UE (not shown). One or more neighboring UEs (including a third UE 115-*b*) may respond or report back (to the first UE 115-*a*) with one or more matching semi-static traffic patterns (via sidelink communication link 235), which are then used by the first UE 115-*a* to select at least one of the neighboring UEs (e.g., the third UE 115-*b*). The first UE 115-*a* may then transmit an indication of selection to the third UE 115-*b*. During an upcoming time period, the first UE 115-*a* may simultaneously communicate with the second UE (not shown) and the third UE 115-*b*. In some instances, the first UE may be a full-duplex capable UE and the communication between the first UE 115-*a* and the third UE 115-*b* may be a full-duplex communication.

Figure 3:
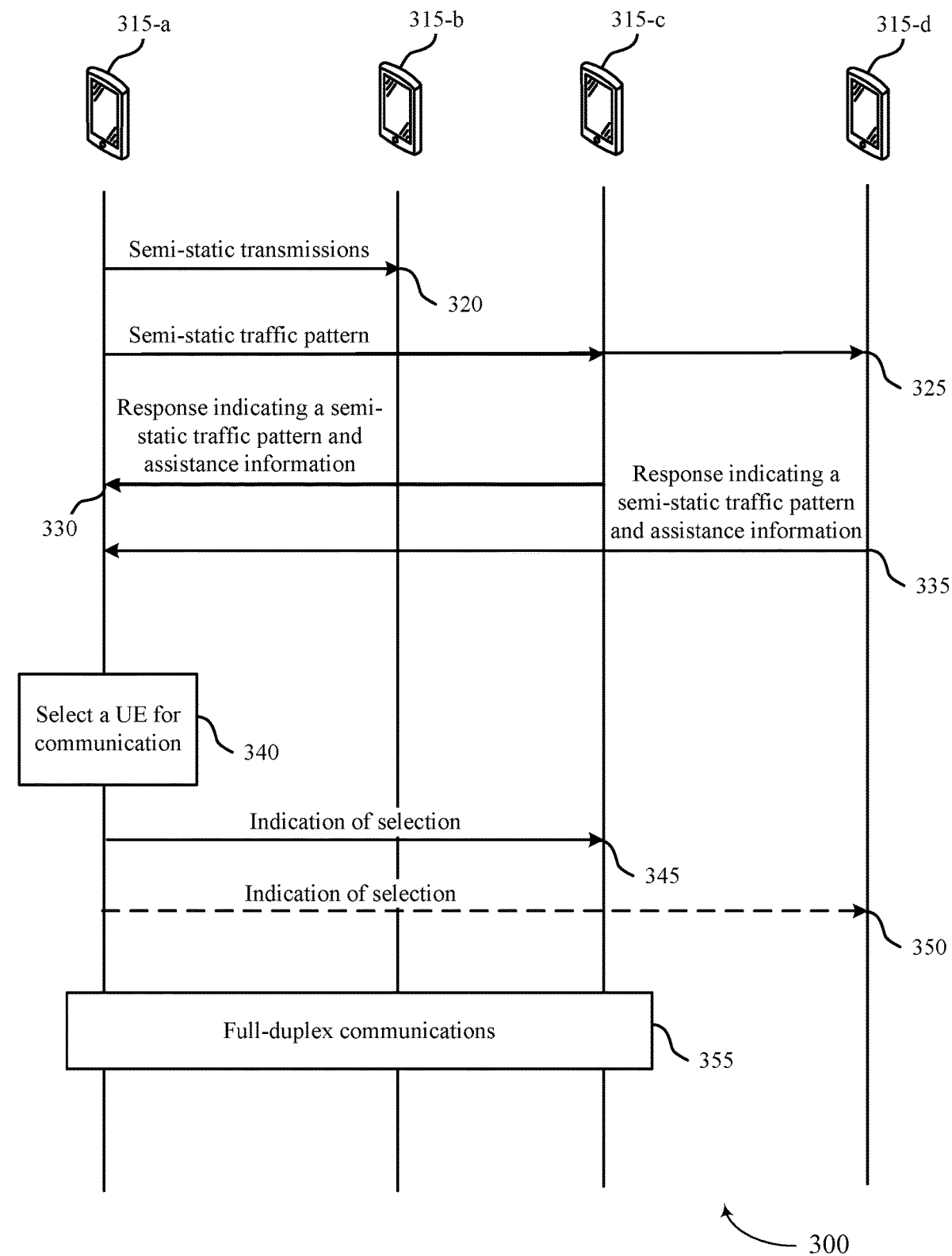
FIG. 3 illustrates an example of a process flow that supports techniques for sidelink full-duplex semi-static transmissions in accordance with aspects of the present disclosure.

FIG. 3 illustrates an example of a process flow 300 that supports techniques for sidelink full-duplex semi-static transmissions in accordance with aspects of the present disclosure. In some examples, the process flow 300 may implement aspects of the wireless communications system 100 and 200 described with reference to FIGS. 1 and 2, respectively. For example, the process flow 300 may be based on a signaling procedure to perform sidelink full-duplex semi-static transmissions between a set of UEs.

The process flow 300 may be implemented by a UE 315-*a*, a UE 315-*b*, a UE 315-*c*, and a UE 315-*d* for reduced power consumption, and may promote low latency for wireless communications, among other benefits. The UE 315-*a*, the UE 315-*b*, the UE 315-*c*, and the UE 315-*d* may be examples of a UE 115, as described with reference to FIGS. 1 and 2. In the following description of the process flow 300, the operations between the UE 315-*a*, the UE 315-*b*, the UE 315-*c*, and the UE 315-*d* may be transmitted in a different order than the example order shown, or the operations performed by the UE 315-*a*, the UE 315-*b*, the UE 315-*c*, and the UE 315-*d* may be performed in different orders or at different times. Some operations may also be omitted from the process flow 300, and other operations may be added to the process flow 300.

At 320, a first UE 315-*a* may transmit a semi-static transmission to a second UE 315-*b*. In one example, the first UE 315-*a* may transmit the semi-static transmissions to the second UE 315-*b* at time slots 1, 3, 5, and 7. The first UE 315-*a* may determine that the first UE 315-*a* may support semi-static receptions from another UE to the first UE 315-*a* at time slots 2, 4, 6, and 8.

At 325, the first UE 315-*a* may transmit, to a set of UEs (including a third UE 315-*c* and a fourth UE 315-*d*), an indication of a first semi-static traffic pattern between the first UE 315-*a* and the second UE 315-*b*. In some examples, the first semi-static traffic pattern indicates a pattern for transmission or reception between the first UE 315-*a* and the second UE 315-*b* using a beam pair during a time period.

In some examples, the first UE 315-*a* may broadcast, to the set of UEs, the indication of the first semi-static traffic pattern between the first UE 315-*a* and the second UE 315-*b*. In some examples, the first UE 315-*a* may multicast, to the set of UEs, the indication of the first semi-static traffic pattern between the first UE 315-*a* and the second UE 315-*b*. Thus, the first UE 315-*a* may broadcast some or all semi-static traffic patterns with associated candidate beam pairs of the first UE 315-*a* (e.g., full-duplex capable UE) to neighboring UEs to search for one or more full-duplex transmission opportunities. In some examples, the first UE 315-*a* may multicast to the compatible neighboring UEs indicating the beams that can be paired for full-duplex with the existing link's beam (e.g., link between transmit beam for the first UE 315-*a* and a receive beam for the second UE 315-*b*). The first UE 315-*a* may preselect the compatible neighboring UEs via sidelink beam management.

At 330, the first UE 315-*a* may receive, from the third UE 315-*c* of the set of UEs, a response indicating a second semi-static traffic pattern for the time period. At 335, the first UE 315-*a* may receive, from the fourth UE 315-*d* of the set of UEs, a response indicating a third semi-static traffic pattern for the time period. In some examples, the reported semi-static traffic pattern may correspond to the first semi-static traffic pattern during the time period. For example, the first UE 315-*a* may receive, from the third UE 315-*c*, the response indicating the second semi-static traffic pattern corresponding to the first semi-static traffic pattern during the time period. The first UE 315-*a* may also receive, from a fourth UE 315-*d*, the response indicating the third semi-static traffic pattern for the time period corresponding to the first semi-static traffic pattern during the time period.

One or more neighboring UEs may respond or report back to the first UE 315-*a* with one or more matching semi-static traffic patterns that can be full-duplexed with the communications between the first UE 315-*a* and the second UE 315-*b*. In some examples, the neighboring UEs may send more information to assist the first UE 315-*a* in selecting a neighboring UE for full-duplex communication. For instance, the first UE 315-*a* may receive, from the third UE 315-*c* and the fourth UE 315-*d* of the set of UEs, assistance information associated with one or more semi-static traffic patterns for the time period. The first UE 315-*a* may transmit an indication of selection of the second semi-static traffic pattern is based on the assistance information. Such assistance information may include at least one of a traffic periodicity, a traffic priority, a beam identifier associated with a second beam pair, a quality metric associated with the second beam pair, or a combination thereof. The quality metric may include a beam quality measured by the synchronization signal block broadcasted by the first UE 315-*a*.

In some examples, the first UE 315-*a* may receive, from the third UE 315-*c*, the response indicating the second semi-static traffic pattern corresponding to the first semi-static traffic pattern during a first portion of the time period. Additionally, the first UE 315-*a* may receive, from a fourth UE 315-*d*, the response indicating a third semi-static traffic pattern corresponding to the first semi-static traffic pattern during a second portion of the time period.

At 340, the first UE 315-*a* may select a neighboring UE for communicating with during the time period. In some examples, the first UE 315-*a* may select the second semi-static traffic pattern associated with the third UE 315-*c* based on the second semi-static traffic pattern and the third semi-static traffic pattern. In some examples where the first UE 315-*a* receives the second semi-static traffic pattern for a first portion of the time period and the third semi-static traffic pattern for a second portion of the time period, the first UE 315-*a* may select the second semi-static traffic pattern associated with the third UE 315-*c* for the first portion of the time period based on the second semi-static traffic pattern. The first UE 315-*a* may also select the third semi-static traffic pattern associated with the fourth UE 315-*d* for the second portion of the time period based on the third semi-static traffic pattern. In some examples, the second semi-static traffic pattern and the third semi-static traffic pattern may be associated with different periodicities.

In the example of FIG. 3, the first UE 315-*a* selects a neighbor UE (third UE 315-*c*) based on the assistance information indicating that the transmissions to or receptions from the third UE 315-*c* may be full-duplexed with the communication with the second UE 315-*b*. In some examples, the first UE 315-*a* may select more than one neighbor UEs that can perform full-duplex communications with the first UE 315-*a* (e.g., at different time slots).

At 345, the first UE 315-*a* may transmit, to the third UE 315-*c* of the one or more UEs, an indication of selection of the second semi-static traffic pattern for communication between the first UE 315-*a* and the third UE 315-*c* during the time period. The first UE 315-*a* may indicate a beam information to the selected UE (e.g., third UE 315-*c*).

In some examples, the first UE 315-*a* may transmit, to the third UE 315-*c* of the one or more UEs, an indication of selection of the second semi-static traffic pattern for communication between the first UE 315-*a* and the third UE 315-*c* during the first portion of the time period. At 350, the first UE 315-*a* may optionally transmit, to the fourth UE 315-*d* of the one or more UEs, a second indication of selection of the third semi-static traffic pattern between the first UE 315-*a* and the fourth UE 315-*d* for communicating during the second portion of the time period.

At 355, the first UE 315-*a* may perform dull-duplex communications with the second UE 315-*b* and the third UE 315-*c*. that is, the first UE 315-*a* may communicate, during the time period, with the second UE 315-*b* according to the first semi-static traffic pattern and the third UE 315-*c* according to the second semi-static traffic pattern based on transmitting the indication of selection of the second semi-static traffic pattern. Although not shown in the example of FIG. 3, the first UE 315-*a* may communicate, during a first portion of the time period, with the second UE 315-*b* according to the first semi-static traffic pattern and the third UE 315-*c* according to the second semi-static traffic pattern based on transmitting the indication of selection of the second semi-static traffic pattern. Additionally, the first UE 315-*a* may communicate, during a second portion of the time period, with the second UE 315-*b* according to the second semi-static traffic pattern and the fourth UE 315-*d* according to the third semi-static traffic pattern based on transmitting the second indication of selection of the third semi-static traffic pattern.

Figure 4:
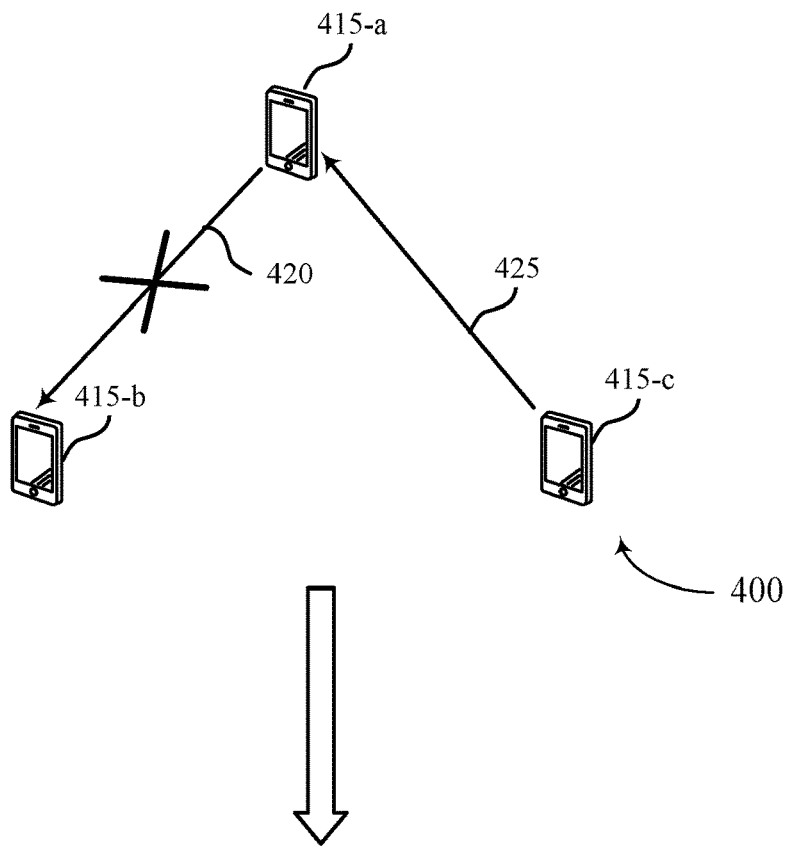
FIG. 4 illustrates an example of semi-static transmission procedures that support techniques for sidelink full-duplex semi-static transmissions in accordance with aspects of the present disclosure.
Figure 4:
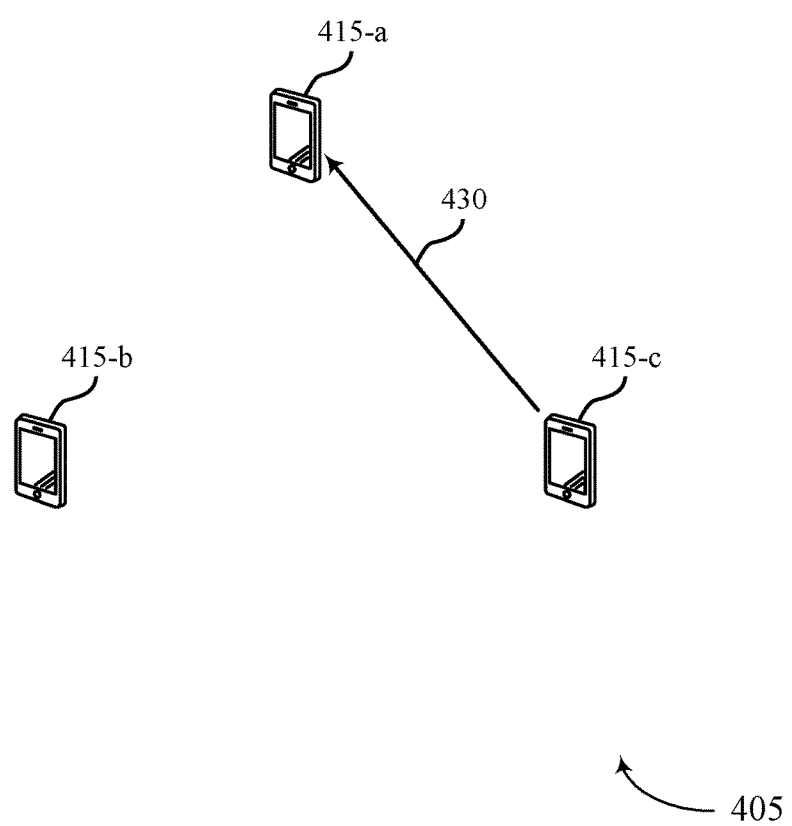

FIG. 4 illustrates an example of semi-static transmission procedure 400 and semi-static transmission procedure 405 that support techniques for sidelink full-duplex semi-static transmissions in accordance with aspects of the present disclosure. In some examples, the semi-static transmission procedure 400 and the semi-static transmission procedure 405 may implement aspects of the wireless communications system 100 and 200 described with reference to FIGS. 1 and 2, respectively. For example, the semi-static transmission procedure 400 and the semi-static transmission procedure 405 may be based on a signaling procedure to perform sidelink full-duplex semi-static transmissions between a set of UEs.

The semi-static transmission procedure 400 and the semi-static transmission procedure 405 may be implemented by a UE 415-*a*, a UE 415-*b* and a UE 415-*c* for reduced power consumption, and may promote low latency for wireless communications, among other benefits. At depicted with reference to the semi-static transmission procedure 400, a first UE 415-*a* may establish full-duplex communications with a second UE 415-*b* and a third UE 415-*c*. In some examples, the first UE 415-*a* may transmit semi-static transmissions to the second UE 415-*b* via sidelink communications link 420. The first UE 415-*a* may additionally receive semi-static transmissions from the third UE 415-*c* via sidelink communications link 425. The first UE 415-*a*, the second UE 415-*b*, and the third UE 415-*c* may establish the full-duplex communications according to the procedures described with reference to FIG. 3.

According to one or more aspects, the first UE 415-a may communicate, during a time period, with the second UE 415-b according to a first semi-static traffic pattern and the third UE 415-c according to a second semi-static traffic pattern. In some examples, the first UE 415-a may determine a cancellation of a transmission during a subset of the first semi-static traffic pattern. If there is cancellation of data transmissions (e.g., from the first UE 415-a to the second UE 415-b) on some semi-static occasions, the first UE 415-a may forward or signal the information to the third UE 415-c. Additionally or alternatively, the first UE 415-a may signal to indicate, to the third UE 415-c, adjusted parameters associated with the second semi-static traffic pattern based on determining the cancellation of the transmission. In some examples, the first UE 415-a may determine that the first UE 415-a is operating in half-duplex due to cancellation of the transmission to the second UE 415-b. In such cases, the first UE 415-a may adjust one or more parameters related to the ongoing communication with the third UE 415-c. In some examples, the adjusted parameters comprise at least one of a beam, a modulation and coding scheme, a transmit power, a rank indicator, a precoder, or a combination thereof. As depicted with reference to the semi-static transmission procedure 405, the first UE 415-a and the third UE 415-c may participate in a half-duplex communication with adjusted parameters (parameters adjusted due to the switch from the full-duplex mode to the half-duplex mode at the first UE 415-a). Therefore, the third UE 415-c continues the semi-static transmissions to the first UE 415-a (via sidelink communications link 430), but with switched parameters due to the cancellation of the corresponding semi-static occasions. In some examples, the first UE 415-a may determine that a transmit beam or receive beam have changed due to cancellation of self-interference at the first UE 415-a (cancellation of data transmissions from the first UE 415-a to the second UE 415-b). In such cases, the first UE 415-a may indicate an updated transmit beam or receive beam based on determining the change in transmit beam or receive beam.

Figure 5:
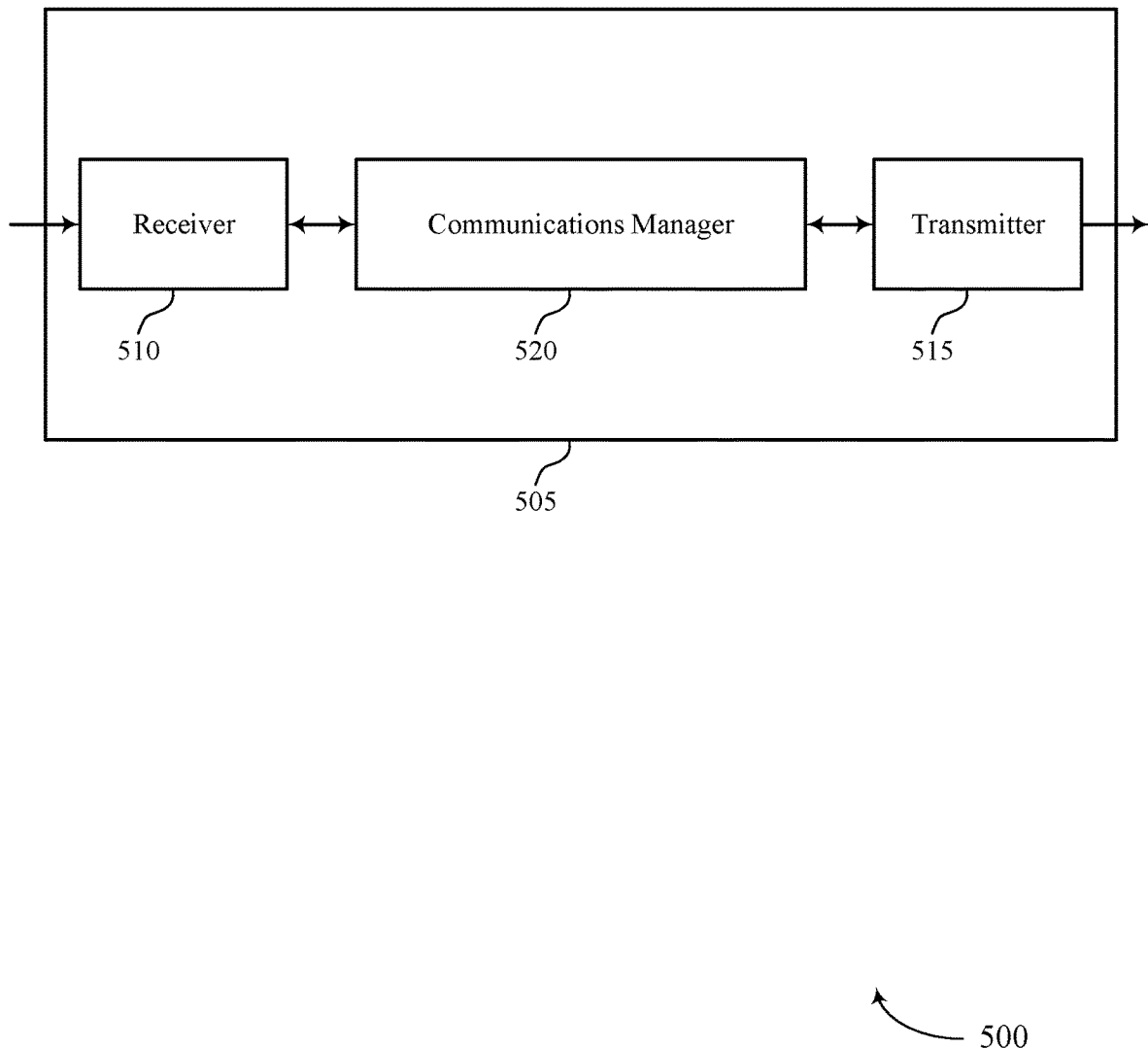
FIGS. 5 and 6 show block diagrams of devices that support techniques for sidelink full-duplex semi-static transmissions in accordance with aspects of the present disclosure.

FIG. 5 shows a block diagram 500 of a device 505 that supports techniques for sidelink full-duplex semi-static transmissions in accordance with aspects of the present disclosure. The device 505 may be an example of aspects of a UE 115 as described herein. For example, the device 505 may be an example of a first UE, second, UE, third UE, or combination thereof described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sidelink full-duplex semi-static transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sidelink full-duplex semi-static transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sidelink full-duplex semi-static transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for transmitting, to a set of UEs, an indication of a first semi-static traffic pattern between the first UE and a second UE, where the first semi-static traffic pattern indicates a pattern for transmission or reception between the first UE and the second UE using a beam pair during a time period. The communications manager 520 may be configured as or otherwise support a means for receiving, from one or more UEs of the set of UEs, a response indicating one or more semi-static traffic patterns for the time period, the one or more semi-static traffic patterns corresponding to the first semi-static traffic pattern during the time period. The communications manager 520 may be configured as or otherwise support a means for transmitting, to a third UE of the one or more UEs, an indication of selection of a second semi-static traffic pattern for communication between the first UE and the third UE during the time period.

Additionally or alternatively, the communications manager 520 may support wireless communications in accordance with examples as disclosed herein. For example, the communications manager 520 may be configured as or otherwise support a means for receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period. The communications manager 520 may be configured as or otherwise support a means for transmitting, to the first UE, a response indicating a second semi-static traffic pattern corresponding to the first semi-static traffic pattern during the time period. The communications manager 520 may be configured as or otherwise support a means for receiving, from the first UE, an indication of selection of the second semi-static traffic pattern for communication between the first UE and the third UE during the time period.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
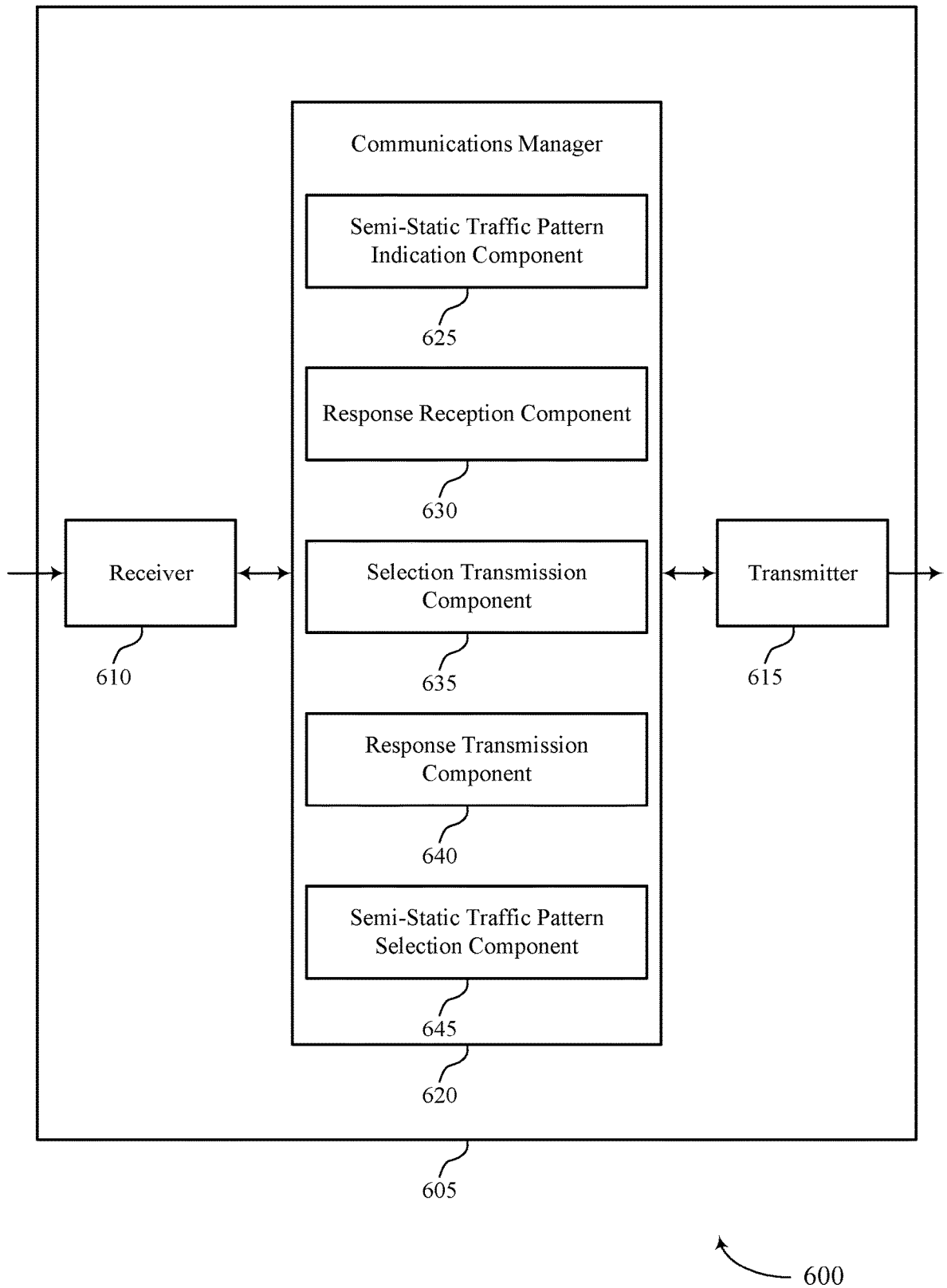

FIG. 6 shows a block diagram 600 of a device 605 that supports techniques for sidelink full-duplex semi-static transmissions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink full-duplex semi-static transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink full-duplex semi-static transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sidelink full-duplex semi-static transmissions as described herein. For example, the communications manager 620 may include a semi-static traffic pattern indication component 625, a response reception component 630, a selection transmission component 635, a response transmission component 640, a semi-static traffic pattern selection component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The semi-static traffic pattern indication component 625 may be configured as or otherwise support a means for transmitting, to a set of UEs, an indication of a first semi-static traffic pattern between the first UE and a second UE, where the first semi-static traffic pattern indicates a pattern for transmission or reception between the first UE and the second UE using a beam pair during a time period. The response reception component 630 may be configured as or otherwise support a means for receiving, from one or more UEs of the set of UEs, a response indicating one or more semi-static traffic patterns for the time period, the one or more semi-static traffic patterns corresponding to the first semi-static traffic pattern during the time period. The selection transmission component 635 may be configured as or otherwise support a means for transmitting, to a third UE of the one or more UEs, an indication of selection of a second semi-static traffic pattern for communication between the first UE and the third UE during the time period.

Additionally or alternatively, the communications manager 620 may support wireless communications in accordance with examples as disclosed herein. The semi-static traffic pattern indication component 625 may be configured as or otherwise support a means for receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period. The response transmission component 640 may be configured as or otherwise support a means for transmitting, to the first UE, a response indicating a second semi-static traffic pattern corresponding to the first semi-static traffic pattern during the time period. The semi-static traffic pattern selection component 645 may be configured as or otherwise support a means for receiving, from the first UE, an indication of selection of the second semi-static traffic pattern for communication between the first UE and the third UE during the time period.

Figure 7:
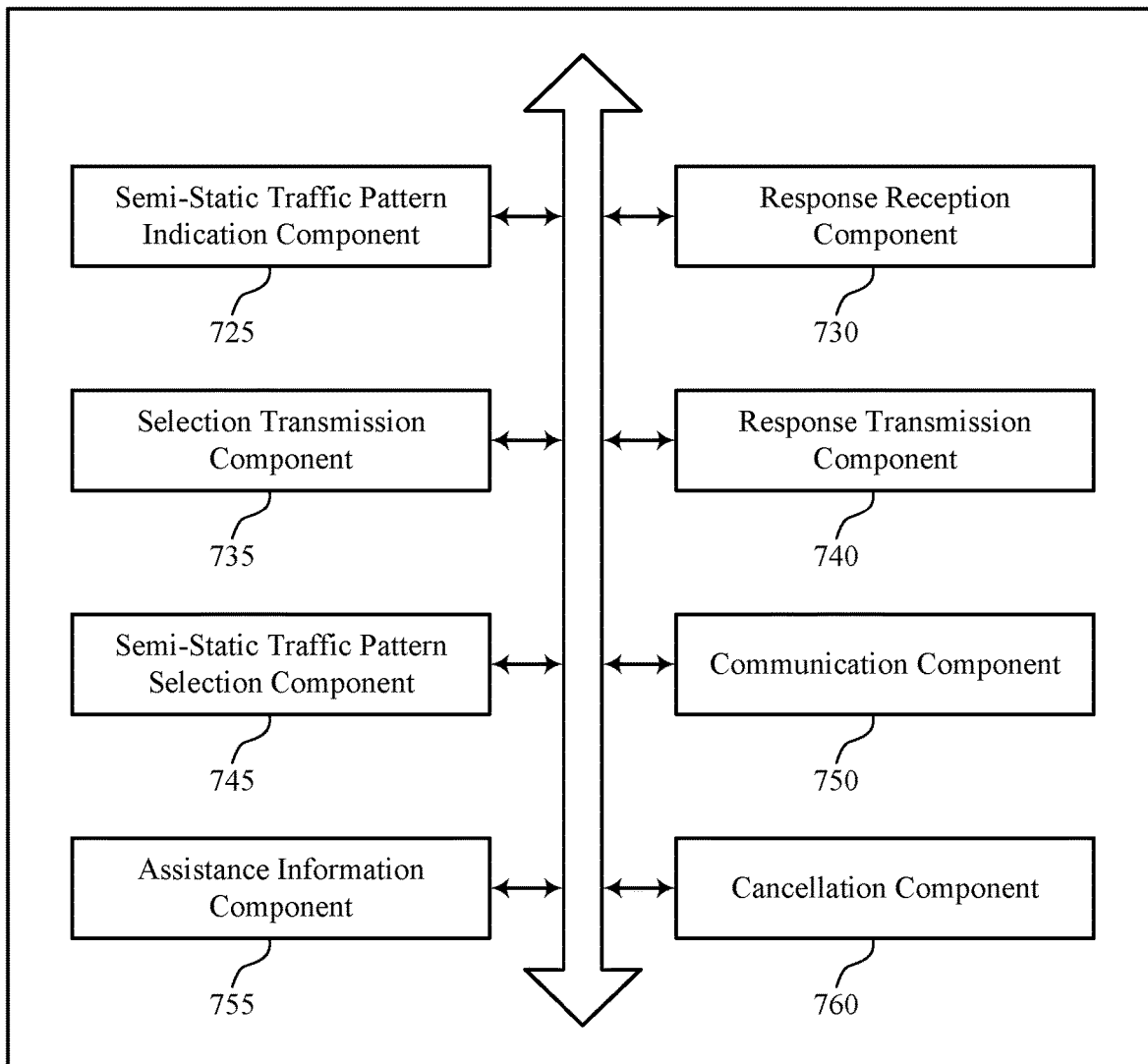
FIG. 7 shows a block diagram of a communications manager that supports techniques for sidelink full-duplex semi-static transmissions in accordance with aspects of the present disclosure.

FIG. 7 shows a block diagram 700 of a communications manager 720 that supports techniques for sidelink full-duplex semi-static transmissions in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for sidelink full-duplex semi-static transmissions as described herein. For example, the communications manager 720 may include a semi-static traffic pattern indication component 725, a response reception component 730, a selection transmission component 735, a response transmission component 740, a semi-static traffic pattern selection component 745, a communication component 750, an assistance information component 755, a cancellation component 760, or any combination thereof. Each of these components may communicate, directly or indirectly, with one another (e.g., via one or more buses).

The communications manager 720 may support wireless communications at a first UE in accordance with examples as disclosed herein. The semi-static traffic pattern indication component 725 may be configured as or otherwise support a means for transmitting, to a set of UEs, an indication of a first semi-static traffic pattern between the first UE and a second UE, where the first semi-static traffic pattern indicates a pattern for transmission or reception between the first UE and the second UE using a beam pair during a time period. The response reception component 730 may be configured as or otherwise support a means for receiving, from one or more UEs of the set of UEs, a response indicating one or more semi-static traffic patterns for the time period, the one or more semi-static traffic patterns corresponding to the first semi-static traffic pattern during the time period. The selection transmission component 735 may be configured as or otherwise support a means for transmitting, to a third UE of the one or more UEs, an indication of selection of a second semi-static traffic pattern for communication between the first UE and the third UE during the time period.

In some examples, to support transmitting the indication of the first semi-static traffic pattern, the semi-static traffic pattern indication component 725 may be configured as or otherwise support a means for broadcasting, to the set of UEs, the indication of the first semi-static traffic pattern between the first UE and the second UE. In some examples, to support transmitting the indication of the first semi-static traffic pattern, the semi-static traffic pattern indication component 725 may be configured as or otherwise support a means for multicasting, to the set of UEs, the indication of the first semi-static traffic pattern between the first UE and the second UE.

In some examples, the communication component 750 may be configured as or otherwise support a means for communicating, during the time period, with the second UE according to the first semi-static traffic pattern and the third UE according to the second semi-static traffic pattern based on transmitting the indication of selection of the second semi-static traffic pattern.

In some examples, to support receiving the response, the response reception component 730 may be configured as or otherwise support a means for receiving, from the third UE, the response indicating the second semi-static traffic pattern corresponding to the first semi-static traffic pattern during the time period. In some examples, to support receiving the response, the response reception component 730 may be configured as or otherwise support a means for receiving, from a fourth UE, the response indicating a third semi-static traffic pattern for the time period corresponding to the first semi-static traffic pattern during the time period.

In some examples, the semi-static traffic pattern selection component 745 may be configured as or otherwise support a means for selecting the second semi-static traffic pattern associated with the third UE based on the second semi-static traffic pattern and the third semi-static traffic pattern, where transmitting the indication is based on selecting the second semi-static traffic pattern.

In some examples, the assistance information component 755 may be configured as or otherwise support a means for receiving, from the one or more UEs of the set of UEs, assistance information associated with the one or more semi-static traffic patterns for the time period, where transmitting the indication of selection of the second semi-static traffic pattern is based on the assistance information. In some examples, the assistance information includes at least one of a traffic periodicity, a traffic priority, a beam identifier associated with a second beam pair, a quality metric associated with the second beam pair, or a combination thereof.

In some examples, to support receiving the response, the response reception component 730 may be configured as or otherwise support a means for receiving, from the third UE, the response indicating the second semi-static traffic pattern corresponding to the first semi-static traffic pattern during a first portion of the time period. In some examples, to support receiving the response, the response reception component 730 may be configured as or otherwise support a means for receiving, from a fourth UE, the response indicating a third semi-static traffic pattern corresponding to the first semi-static traffic pattern during a second portion of the time period.

In some examples, the semi-static traffic pattern selection component 745 may be configured as or otherwise support a means for selecting the second semi-static traffic pattern associated with the third UE for the first portion of the time period based on the second semi-static traffic pattern, where transmitting the indication is based on selecting the second semi-static traffic pattern. In some examples, the semi-static traffic pattern selection component 745 may be configured as or otherwise support a means for selecting the third semi-static traffic pattern associated with the fourth UE for the second portion of the time period based on the third semi-static traffic pattern.

In some examples, the semi-static traffic pattern indication component 725 may be configured as or otherwise support a means for transmitting, to the fourth UE of the one or more UEs, a second indication of selection of the third semi-static traffic pattern between the first UE and the fourth UE for communicating during the second portion of the time period.

In some examples, the communication component 750 may be configured as or otherwise support a means for communicating, during the second portion of the time period, with the second UE according to the second semi-static traffic pattern and the fourth UE according to the third semi-static traffic pattern based on transmitting the second indication of selection of the third semi-static traffic pattern. In some examples, the second semi-static traffic pattern and the third semi-static traffic pattern are associated with different periodicities.

In some examples, the cancellation component 760 may be configured as or otherwise support a means for determining a cancellation of a transmission during a subset of the first semi-static traffic pattern. In some examples, the semi-static traffic pattern indication component 725 may be configured as or otherwise support a means for transmitting, to the third UE of the one or more UEs, a second indication of adjusted parameters associated with the second semi-static traffic pattern based on determining the cancellation of the transmission.

In some examples, the adjusted parameters include at least one of a beam, a modulation and coding scheme, a transmit power, a rank indicator, a precoder, or a combination thereof. In some examples, the first UE includes a full-duplex capable UE and the communication between the first UE and the third UE includes a full-duplex communication.

Additionally or alternatively, the communications manager 720 may support wireless communications in accordance with examples as disclosed herein. In some examples, the semi-static traffic pattern indication component 725 may be configured as or otherwise support a means for receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period. The response transmission component 740 may be configured as or otherwise support a means for transmitting, to the first UE, a response indicating a second semi-static traffic pattern corresponding to the first semi-static traffic pattern during the time period. The semi-static traffic pattern selection component 745 may be configured as or otherwise support a means for receiving, from the first UE, an indication of selection of the second semi-static traffic pattern for communication between the first UE and the third UE during the time period.

In some examples, to support receiving the indication of the first semi-static traffic pattern, the semi-static traffic pattern indication component 725 may be configured as or otherwise support a means for receiving a broadcast of the indication of the first semi-static traffic pattern between the first UE and the second UE. In some examples, to support receiving the indication of the first semi-static traffic pattern, the semi-static traffic pattern indication component 725 may be configured as or otherwise support a means for receiving a multicast of the indication of the first semi-static traffic pattern between the first UE and the second UE.

In some examples, the communication component 750 may be configured as or otherwise support a means for communicating, during the time period, with the first UE according to the second semi-static traffic pattern based on receiving the indication of selection of the second semi-static traffic pattern. In some examples, the assistance information component 755 may be configured as or otherwise support a means for transmitting, to the first UE, assistance information associated with the second semi-static traffic pattern for the time period, where receiving the indication of selection of the second semi-static traffic pattern is based on the assistance information.

In some examples, the assistance information includes at least one of a traffic periodicity, a traffic priority, a beam identifier associated with a second beam pair, a quality metric associated with the second beam pair, or a combination thereof. In some examples, to support transmitting the response, the response transmission component 740 may be configured as or otherwise support a means for transmitting, to the first UE, the response indicating the second semi-static traffic pattern corresponding to the first semi-static traffic pattern during a first portion of the time period.

In some examples, the semi-static traffic pattern indication component 725 may be configured as or otherwise support a means for receiving, from the first UE, a second indication of adjusted parameters associated with the second semi-static traffic pattern based on a cancellation of a transmission during a subset of the first semi-static traffic pattern.

In some examples, the adjusted parameters include at least one of a beam, a modulation and coding scheme, a transmit power, a rank indicator, a precoder, or a combination thereof. In some examples, the first UE includes a full-duplex capable UE and the communication between the first UE and the third UE includes a full-duplex communication.

Figure 8:
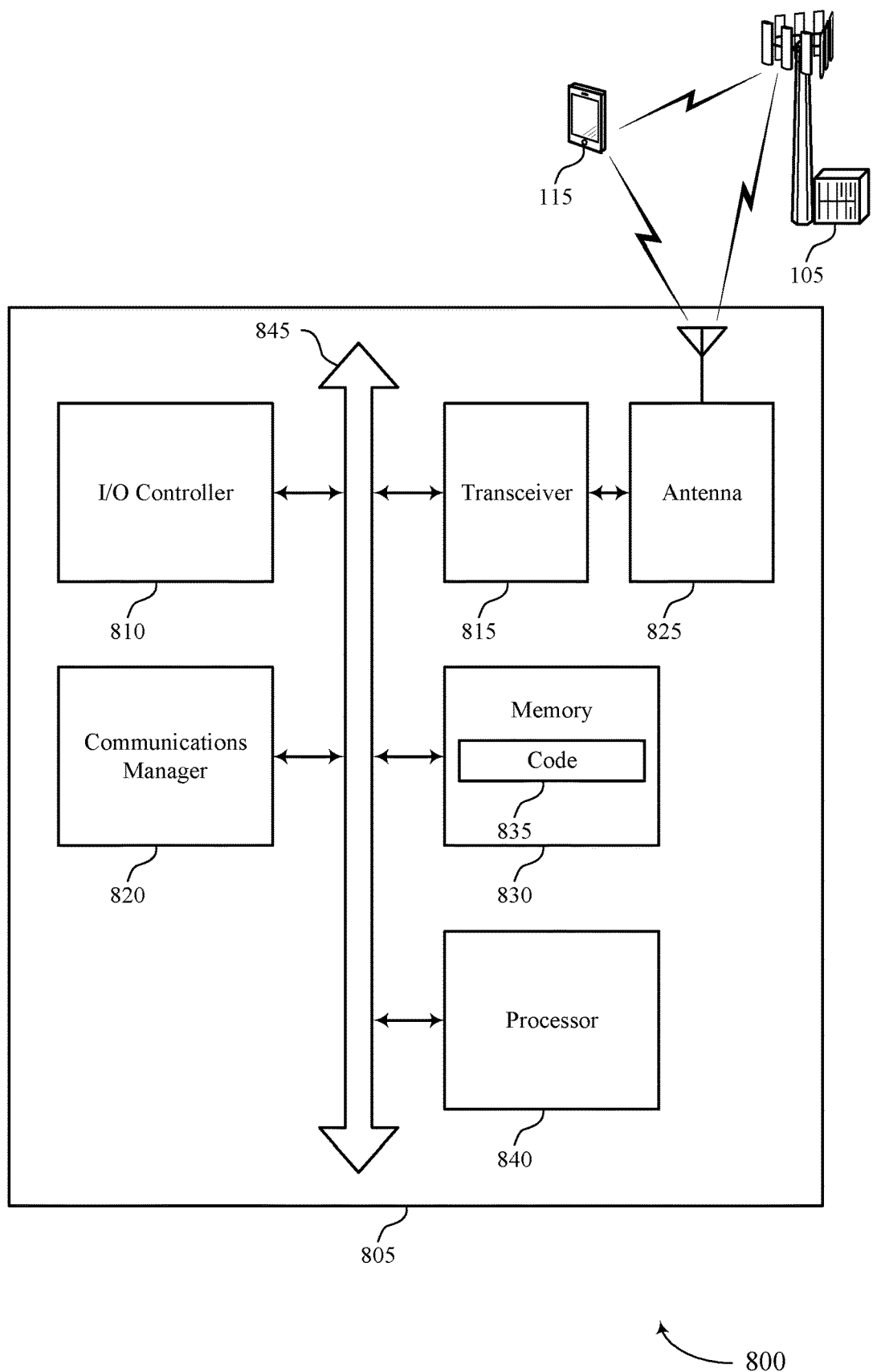
FIG. 8 shows a diagram of a system including a device that supports techniques for sidelink full-duplex semi-static transmissions in accordance with aspects of the present disclosure.

FIG. 8 shows a diagram of a system 800 including a device 805 that supports techniques for sidelink full-duplex semi-static transmissions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for sidelink full-duplex semi-static transmissions). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for transmitting, to a set of UEs, an indication of a first semi-static traffic pattern between the first UE and a second UE, where the first semi-static traffic pattern indicates a pattern for transmission or reception between the first UE and the second UE using a beam pair during a time period. The communications manager 820 may be configured as or otherwise support a means for receiving, from one or more UEs of the set of UEs, a response indicating one or more semi-static traffic patterns for the time period, the one or more semi-static traffic patterns corresponding to the first semi-static traffic pattern during the time period. The communications manager 820 may be configured as or otherwise support a means for transmitting, to a third UE of the one or more UEs, an indication of selection of a second semi-static traffic pattern for communication between the first UE and the third UE during the time period.

Additionally or alternatively, the communications manager 820 may support wireless communications in accordance with examples as disclosed herein. For example, the communications manager 820 may be configured as or otherwise support a means for receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period. The communications manager 820 may be configured as or otherwise support a means for transmitting, to the first UE, a response indicating a second semi-static traffic pattern corresponding to the first semi-static traffic pattern during the time period. The communications manager 820 may be configured as or otherwise support a means for receiving, from the first UE, an indication of selection of the second semi-static traffic pattern for communication between the first UE and the third UE during the time period.

By including or configuring the communications manager 820 in accordance with examples as described herein, the device 805 may support techniques for improved communication reliability, reduced latency, improved user experience related to reduced processing, reduced power consumption, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for sidelink full-duplex semi-static transmissions as described herein, or the processor 840 and the memory 830 may be otherwise configured to perform or support such operations.

Figure 9:
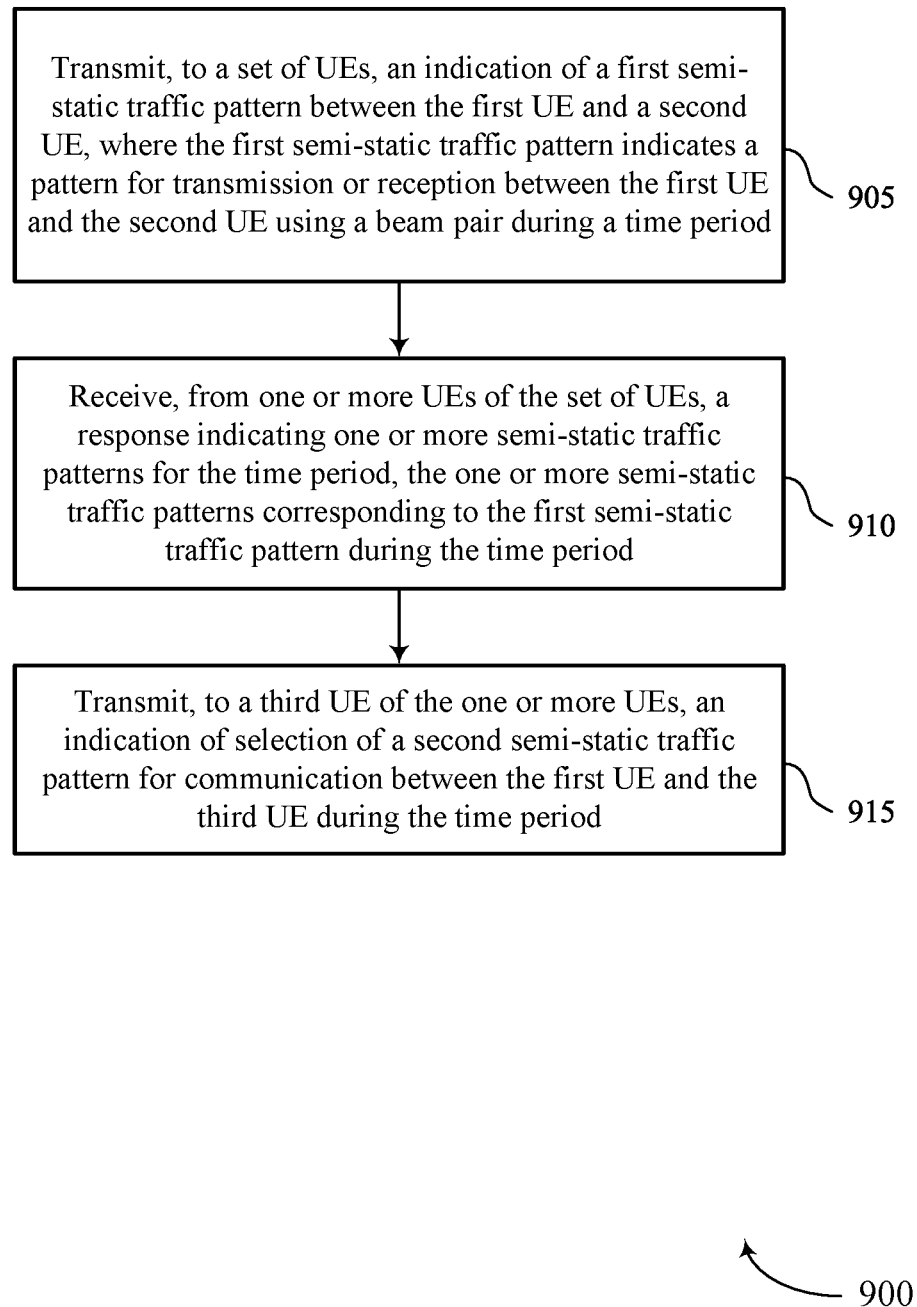
FIGS. 9 through 12 show flowcharts illustrating methods that support techniques for sidelink full-duplex semi-static transmissions in accordance with aspects of the present disclosure.

FIG. 9 shows a flowchart illustrating a method 900 that supports techniques for sidelink full-duplex semi-static transmissions in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include transmitting, to a set of UEs, an indication of a first semi-static traffic pattern between the first UE and a second UE, where the first semi-static traffic pattern indicates a pattern for transmission or reception between the first UE and the second UE using a beam pair during a time period. The operations of 905 may be performed in accordance with examples as disclosed herein. In some examples, aspects of the operations of 905 may be performed by a semi-static traffic pattern indication component 725 as described with reference to FIG. 7.

At 910, the method may include receiving, from one or more UEs of the set of UEs, a response indicating one or more semi-static traffic patterns for the time period, the one or more semi-static traffic patterns corresponding to the first semi-static traffic pattern during the time period. The operations of 910 may be performed in accordance with examples as disclosed herein. In some examples, aspects of the operations of 910 may be performed by a response reception component 730 as described with reference to FIG. 7.

At 915, the method may include transmitting, to a third UE of the one or more UEs, an indication of selection of a second semi-static traffic pattern for communication between the first UE and the third UE during the time period. The operations of 915 may be performed in accordance with examples as disclosed herein. In some examples, aspects of the operations of 915 may be performed by a selection transmission component 735 as described with reference to FIG. 7.

Figure 10:
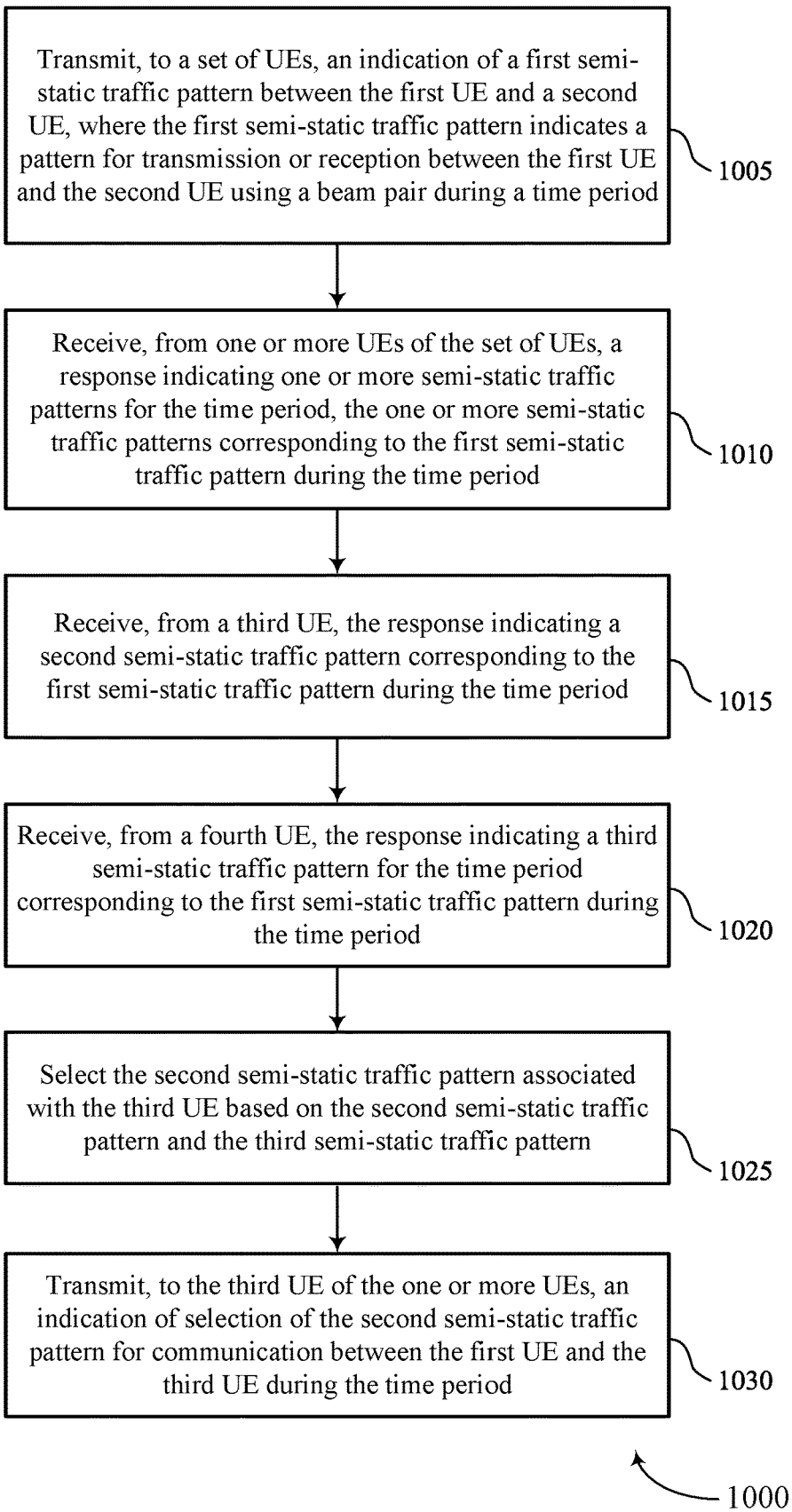

FIG. 10 shows a flowchart illustrating a method 1000 that supports techniques for sidelink full-duplex semi-static transmissions in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include transmitting, to a set of UEs, an indication of a first semi-static traffic pattern between the first UE and a second UE, where the first semi-static traffic pattern indicates a pattern for transmission or reception between the first UE and the second UE using a beam pair during a time period. The operations of 1005 may be performed in accordance with examples as disclosed herein. In some examples, aspects of the operations of 1005 may be performed by a semi-static traffic pattern indication component 725 as described with reference to FIG. 7.

At 1010, the method may include receiving, from one or more UEs of the set of UEs, a response indicating one or more semi-static traffic patterns for the time period, the one or more semi-static traffic patterns corresponding to the first semi-static traffic pattern during the time period. The operations of 1010 may be performed in accordance with examples as disclosed herein. In some examples, aspects of the operations of 1010 may be performed by a response reception component 730 as described with reference to FIG. 7.

At 1015, the method may include receiving, from a third UE, the response indicating a second semi-static traffic pattern corresponding to the first semi-static traffic pattern during the time period. The operations of 1015 may be performed in accordance with examples as disclosed herein. In some examples, aspects of the operations of 1015 may be performed by a response reception component 730 as described with reference to FIG. 7.

At 1020, the method may include receiving, from a fourth UE, the response indicating a third semi-static traffic pattern for the time period corresponding to the first semi-static traffic pattern during the time period. The operations of 1020 may be performed in accordance with examples as disclosed herein. In some examples, aspects of the operations of 1020 may be performed by a response reception component 730 as described with reference to FIG. 7.

At 1025, the method may include selecting the second semi-static traffic pattern associated with the third UE based on the second semi-static traffic pattern and the third semi-static traffic pattern. The operations of 1025 may be performed in accordance with examples as disclosed herein. In some examples, aspects of the operations of 1025 may be performed by a semi-static traffic pattern selection component 745 as described with reference to FIG. 7.

At 1030, the method may include transmitting, to the third UE of the one or more UEs, an indication of selection of the second semi-static traffic pattern for communication between the first UE and the third UE during the time period. In some examples, transmitting the indication is based on selecting the second semi-static traffic pattern. The operations of 1030 may be performed in accordance with examples as disclosed herein. In some examples, aspects of the operations of 1030 may be performed by a selection transmission component 735 as described with reference to FIG. 7.

Figure 11:
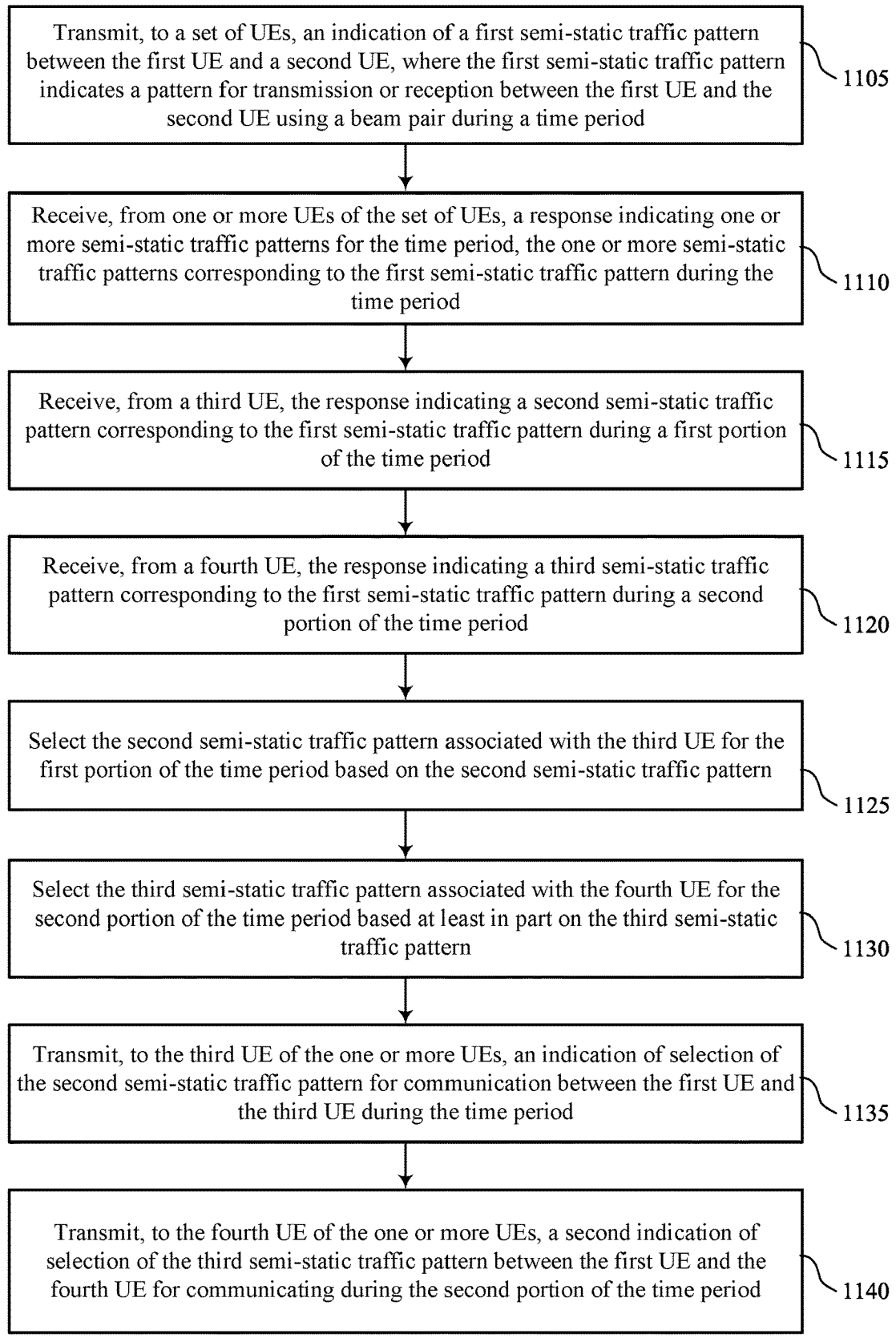

FIG. 11 shows a flowchart illustrating a method 1100 that supports techniques for sidelink full-duplex semi-static transmissions in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting, to a set of UEs, an indication of a first semi-static traffic pattern between the first UE and a second UE, where the first semi-static traffic pattern indicates a pattern for transmission or reception between the first UE and the second UE using a beam pair during a time period. The operations of 1105 may be performed in accordance with examples as disclosed herein. In some examples, aspects of the operations of 1105 may be performed by a semi-static traffic pattern indication component 725 as described with reference to FIG. 7.

At 1110, the method may include receiving, from one or more UEs of the set of UEs, a response indicating one or more semi-static traffic patterns for the time period, the one or more semi-static traffic patterns corresponding to the first semi-static traffic pattern during the time period. The operations of 1110 may be performed in accordance with examples as disclosed herein. In some examples, aspects of the operations of 1110 may be performed by a response reception component 730 as described with reference to FIG. 7.

At 1115, the method may include receiving, from a third UE, the response indicating a second semi-static traffic pattern corresponding to the first semi-static traffic pattern during a first portion of the time period. The operations of 1115 may be performed in accordance with examples as disclosed herein. In some examples, aspects of the operations of 1115 may be performed by a response reception component 730 as described with reference to FIG. 7.

At 1120, the method may include receiving, from a fourth UE, the response indicating a third semi-static traffic pattern corresponding to the first semi-static traffic pattern during a second portion of the time period. The operations of 1120 may be performed in accordance with examples as disclosed herein. In some examples, aspects of the operations of 1120 may be performed by a response reception component 730 as described with reference to FIG. 7.

At 1125, the method may include selecting the second semi-static traffic pattern associated with the third UE for the first portion of the time period based on the second semi-static traffic pattern. The operations of 1125 may be performed in accordance with examples as disclosed herein. In some examples, aspects of the operations of 1125 may be performed by a semi-static traffic pattern selection component 745 as described with reference to FIG. 7.

At 1130, the method may include selecting the third semi-static traffic pattern associated with the fourth UE for the second portion of the time period based on the third semi-static traffic pattern. The operations of 1130 may be performed in accordance with examples as disclosed herein. In some examples, aspects of the operations of 1130 may be performed by a semi-static traffic pattern selection component 745 as described with reference to FIG. 7.

At 1135, the method may include transmitting, to the third UE of the one or more UEs, an indication of selection of the second semi-static traffic pattern for communication between the first UE and the third UE during the time period. In some examples, transmitting the indication is based on selecting the second semi-static traffic pattern. The operations of 1135 may be performed in accordance with examples as disclosed herein. In some examples, aspects of the operations of 1135 may be performed by a selection transmission component 735 as described with reference to FIG. 7.

At 1140, the method may include transmitting, to the fourth UE of the one or more UEs, a second indication of selection of the third semi-static traffic pattern between the first UE and the fourth UE for communicating during the second portion of the time period. The operations of 1140 may be performed in accordance with examples as disclosed herein. In some examples, aspects of the operations of 1140 may be performed by a semi-static traffic pattern indication component 725 as described with reference to FIG. 7.

Figure 12:
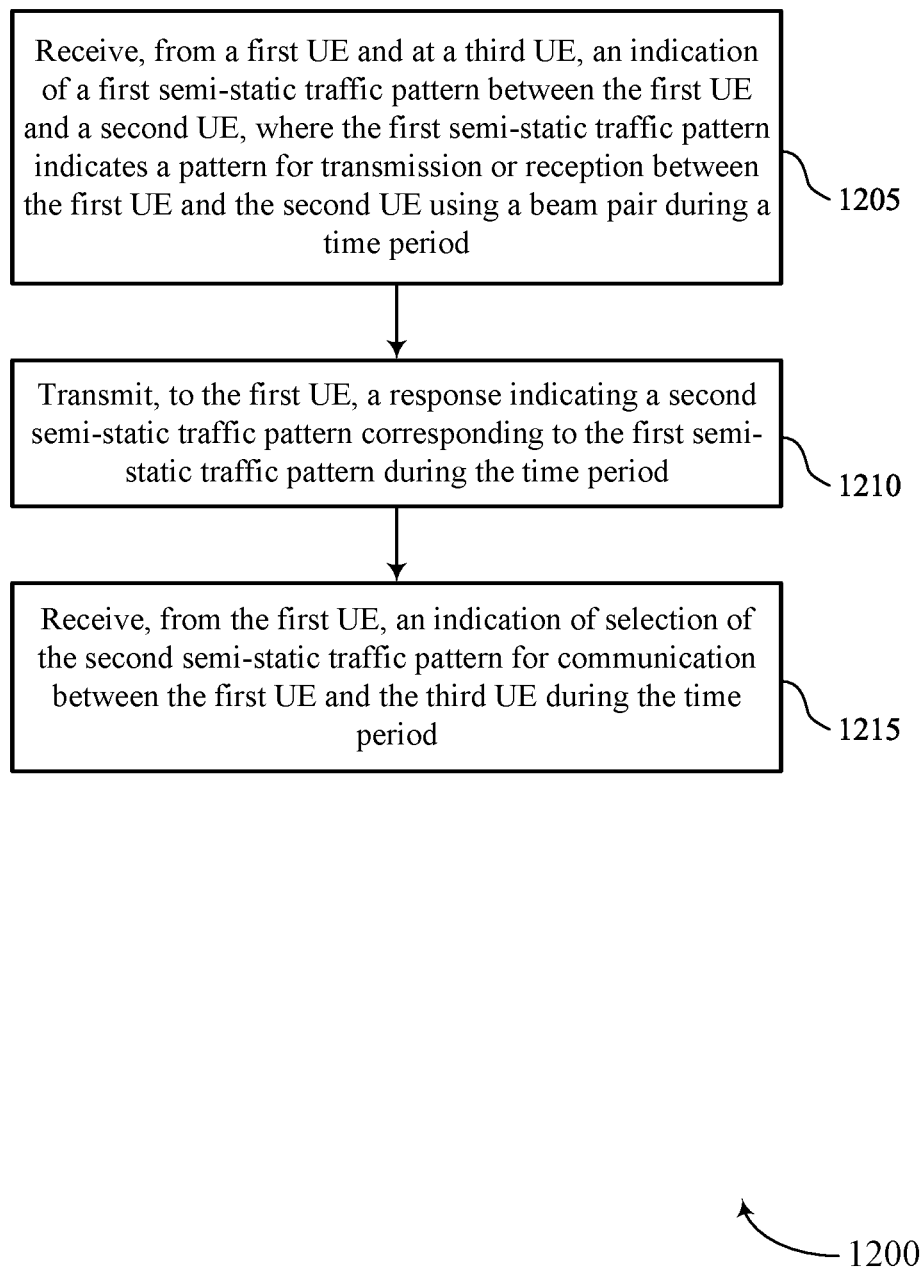

FIG. 12 shows a flowchart illustrating a method 1200 that supports techniques for sidelink full-duplex semi-static transmissions in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a first UE and at a third UE, an indication of a first semi-static traffic pattern between the first UE and a second UE, where the first semi-static traffic pattern indicates a pattern for transmission or reception between the first UE and the second UE using a beam pair during a time period. The operations of 1205 may be performed in accordance with examples as disclosed herein. In some examples, aspects of the operations of 1205 may be performed by a semi-static traffic pattern indication component 725 as described with reference to FIG. 7.

At 1210, the method may include transmitting, to the first UE, a response indicating a second semi-static traffic pattern corresponding to the first semi-static traffic pattern during the time period. The operations of 1210 may be performed in accordance with examples as disclosed herein. In some examples, aspects of the operations of 1210 may be performed by a response transmission component 740 as described with reference to FIG. 7.

At 1215, the method may include receiving, from the first UE, an indication of selection of the second semi-static traffic pattern for communication between the first UE and the third UE during the time period. The operations of 1215 may be performed in accordance with examples as disclosed herein. In some examples, aspects of the operations of 1215 may be performed by a semi-static traffic pattern selection component 745 as described with reference to FIG. 7.

The following provides an overview of aspects of the present disclosure:

Aspect 1: A method for wireless communications at a first UE, comprising: transmitting, to a set of UEs, an indication of a first semi-static traffic pattern between the first UE and a second UE, wherein the first semi-static traffic pattern indicates a pattern for transmission or reception between the first UE and the second UE using a beam pair during a time period; receiving, from one or more UEs of the set of UEs, a response indicating one or more semi-static traffic patterns for the time period, the one or more semi-static traffic patterns corresponding to the first semi-static traffic pattern during the time period; and transmitting, to a third UE of the one or more UEs, an indication of selection of a second semi-static traffic pattern for communication between the first UE and the third UE during the time period.

Aspect 2: The method of aspect 1, wherein transmitting the indication of the first semi-static traffic pattern further comprises: broadcasting, to the set of UEs, the indication of the first semi-static traffic pattern between the first UE and the second UE.

Aspect 3: The method of any of aspects 1 through 2, wherein transmitting the indication of the first semi-static traffic pattern further comprises: multicasting, to the set of UEs, the indication of the first semi-static traffic pattern between the first UE and the second UE.

Aspect 4: The method of any of aspects 1 through 3, further comprising: communicating, during the time period, with the second UE according to the first semi-static traffic pattern and the third UE according to the second semi-static traffic pattern based at least in part on transmitting the indication of selection of the second semi-static traffic pattern.

Aspect 5: The method of any of aspects 1 through 4, wherein receiving the response further comprises: receiving, from the third UE, the response indicating the second semi-static traffic pattern corresponding to the first semi-static traffic pattern during the time period; and receiving, from a fourth UE, the response indicating a third semi-static traffic pattern for the time period corresponding to the first semi-static traffic pattern during the time period.

Aspect 6: The method of aspect 5, further comprising: selecting the second semi-static traffic pattern associated with the third UE based at least in part on the second semi-static traffic pattern and the third semi-static traffic pattern, wherein transmitting the indication is based at least in part on selecting the second semi-static traffic pattern.

Aspect 7: The method of any of aspects 1 through 6, further comprising: receiving, from the one or more UEs of the set of UEs, assistance information associated with the one or more semi-static traffic patterns for the time period, wherein transmitting the indication of selection of the second semi-static traffic pattern is based at least in part on the assistance information.

Aspect 8: The method of aspect 7, wherein the assistance information comprises at least one of a traffic periodicity, a traffic priority, a beam identifier associated with a second beam pair, a quality metric associated with the second beam pair, or a combination thereof.

Aspect 9: The method of any of aspects 1 through 8, wherein receiving the response further comprises: receiving, from the third UE, the response indicating the second semi-static traffic pattern corresponding to the first semi-static traffic pattern during a first portion of the time period; and receiving, from a fourth UE, the response indicating a third semi-static traffic pattern corresponding to the first semi-static traffic pattern during a second portion of the time period.

Aspect 10: The method of aspect 9, further comprising: selecting the second semi-static traffic pattern associated with the third UE for the first portion of the time period based at least in part on the second semi-static traffic pattern, wherein transmitting the indication is based at least in part on selecting the second semi-static traffic pattern; and selecting the third semi-static traffic pattern associated with the fourth UE for the second portion of the time period based at least in part on the third semi-static traffic pattern.

Aspect 11: The method of aspect 10, further comprising: transmitting, to the fourth UE of the one or more UEs, a second indication of selection of the third semi-static traffic pattern between the first UE and the fourth UE for communicating during the second portion of the time period.

Aspect 12: The method of aspect 11, further comprising: communicating, during the second portion of the time period, with the second UE according to the second semi-static traffic pattern and the fourth UE according to the third semi-static traffic pattern based at least in part on transmitting the second indication of selection of the third semi-static traffic pattern.

Aspect 13: The method of any of aspects 9 through 12, wherein the second semi-static traffic pattern and the third semi-static traffic pattern are associated with different periodicities.

Aspect 14: The method of any of aspects 1 through 13, further comprising: determining a cancellation of a transmission during a subset of the first semi-static traffic pattern; and transmitting, to the third UE of the one or more UEs, a second indication of adjusted parameters associated with the second semi-static traffic pattern based at least in part on determining the cancellation of the transmission.

Aspect 15: The method of aspect 14, wherein the adjusted parameters comprise at least one of a beam, a modulation and coding scheme, a transmit power, a rank indicator, a precoder, or a combination thereof.

Aspect 16: The method of any of aspects 1 through 15, wherein the first UE comprises a full-duplex capable UE and the communication between the first UE and the third UE comprises a full-duplex communication.

Aspect 17: A method for wireless communications, comprising: receiving, from a first UE and at a third UE, an indication of a first semi-static traffic pattern between the first UE and a second UE, wherein the first semi-static traffic pattern indicates a pattern for transmission or reception between the first UE and the second UE using a beam pair during a time period; transmitting, to the first UE, a response indicating a second semi-static traffic pattern corresponding to the first semi-static traffic pattern during the time period; and receiving, from the first UE, an indication of selection of the second semi-static traffic pattern for communication between the first UE and the third UE during the time period.

Aspect 18: The method of aspect 17, wherein receiving the indication of the first semi-static traffic pattern further comprises: receiving a broadcast of the indication of the first semi-static traffic pattern between the first UE and the second UE.

Aspect 19: The method of any of aspects 17 through 18, wherein receiving the indication of the first semi-static traffic pattern further comprises: receiving a multicast of the indication of the first semi-static traffic pattern between the first UE and the second UE.

Aspect 20: The method of any of aspects 17 through 19, further comprising: communicating, during the time period, with the first UE according to the second semi-static traffic pattern based at least in part on receiving the indication of selection of the second semi-static traffic pattern.

Aspect 21: The method of any of aspects 17 through 20, further comprising: transmitting, to the first UE, assistance information associated with the second semi-static traffic pattern for the time period, wherein receiving the indication of selection of the second semi-static traffic pattern is based at least in part on the assistance information.

Aspect 22: The method of aspect 21, wherein the assistance information comprises at least one of a traffic periodicity, a traffic priority, a beam identifier associated with a second beam pair, a quality metric associated with the second beam pair, or a combination thereof.

Aspect 23: The method of any of aspects 17 through 22, wherein transmitting the response further comprises: transmitting, to the first UE, the response indicating the second semi-static traffic pattern corresponding to the first semi-static traffic pattern during a first portion of the time period.

Aspect 24: The method of any of aspects 17 through 23, further comprising: receiving, from the first UE, a second indication of adjusted parameters associated with the second semi-static traffic pattern based at least in part on a cancellation of a transmission during a subset of the first semi-static traffic pattern.

Aspect 25: The method of aspect 24, wherein the adjusted parameters comprise at least one of a beam, a modulation and coding scheme, a transmit power, a rank indicator, a precoder, or a combination thereof.

Aspect 26: The method of any of aspects 17 through 25, wherein the first UE comprises a full-duplex capable UE and the communication between the first UE and the third UE comprises a full-duplex communication.

Aspect 27: An apparatus for wireless communications at a first UE, comprising a processor; memory coupled with the processor; and instructions stored in the memory and executable by the processor to cause the apparatus to perform a method of any of aspects 1 through 16.

Aspect 28: An apparatus for wireless communications at a first UE, comprising at least one means for performing a method of any of aspects 1 through 16.

Aspect 29: A non-transitory computer-readable medium storing code for wireless communications at a first UE, the code comprising instructions executable by a processor to perform a method of any of aspects 1 through 16.

Aspect 30: An apparatus for wireless communications, comprising a processor; memory coupled with the processor; and instructions stored in the memory and executable by the processor to cause the apparatus to perform a method of any of aspects 17 through 26.

Aspect 31: An apparatus for wireless communications, comprising at least one means for performing a method of any of aspects 17 through 26.

Aspect 32: A non-transitory computer-readable medium storing code for wireless communications, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting, to a set of UEs, an indication of a first semi-static traffic pattern between the first UE and a second UE, wherein the first semi-static traffic pattern indicates a pattern for transmission or reception between the first UE and the second UE using a beam pair during a time period;
   receiving, from one or more UEs of the set of UEs, a response indicating one or more semi-static traffic patterns for the time period, the one or more semi-static traffic patterns corresponding to the first semi-static traffic pattern during the time period; and transmitting, to a third UE of the one or more UEs, an indication of selection of a second semi-static traffic pattern for communication between the first UE and the third UE during the time period.

2. The method of claim 1, wherein transmitting the indication of the first semi-static traffic pattern further comprises:

broadcasting, to the set of UEs, the indication of the first semi-static traffic pattern between the first UE and the second UE.

3. The method of claim 1, wherein transmitting the indication of the first semi-static traffic pattern further comprises:

multicasting, to the set of UEs, the indication of the first semi-static traffic pattern between the first UE and the second UE.

4. The method of claim 1, further comprising:

communicating, during the time period, with the second UE according to the first semi-static traffic pattern and the third UE according to the second semi-static traffic pattern based at least in part on transmitting the indication of selection of the second semi-static traffic pattern.

5. The method of claim 1, wherein receiving the response further comprises:

receiving, from the third UE, the response indicating the second semi-static traffic pattern corresponding to the first semi-static traffic pattern during the time period; and receiving, from a fourth UE, the response indicating a third semi-static traffic pattern for the time period corresponding to the first semi-static traffic pattern during the time period.

6. The method of claim 5, further comprising:

selecting the second semi-static traffic pattern associated with the third UE based at least in part on the second semi-static traffic pattern and the third semi-static traffic pattern, wherein transmitting the indication is based at least in part on selecting the second semi-static traffic pattern.

7. The method of claim 1, further comprising:

receiving, from the one or more UEs of the set of UEs, assistance information associated with the one or more semi-static traffic patterns for the time period, wherein transmitting the indication of selection of the second semi-static traffic pattern is based at least in part on the assistance information.

8. The method of claim 7, wherein the assistance information comprises at least one of a traffic periodicity, a traffic priority, a beam identifier associated with a second beam pair, a quality metric associated with the second beam pair, or a combination thereof.

9. The method of claim 1, wherein receiving the response further comprises:

receiving, from the third UE, the response indicating the second semi-static traffic pattern corresponding to the first semi-static traffic pattern during a first portion of the time period; and receiving, from a fourth UE, the response indicating a third semi-static traffic pattern corresponding to the first semi-static traffic pattern during a second portion of the time period.

10. The method of claim 9, further comprising:

selecting the second semi-static traffic pattern associated with the third UE for the first portion of the time period based at least in part on the second semi-static traffic pattern, wherein transmitting the indication is based at least in part on selecting the second semi-static traffic pattern; and selecting the third semi-static traffic pattern associated with the fourth UE for the second portion of the time period based at least in part on the third semi-static traffic pattern.

11. The method of claim 10, further comprising:

transmitting, to the fourth UE of the one or more UEs, a second indication of selection of the third semi-static traffic pattern between the first UE and the fourth UE for communicating during the second portion of the time period.

12. The method of claim 11, further comprising:

communicating, during the second portion of the time period, with the second UE according to the second semi-static traffic pattern and the fourth UE according to the third semi-static traffic pattern based at least in part on transmitting the second indication of selection of the third semi-static traffic pattern.

13. The method of claim 9, wherein the second semi-static traffic pattern and the third semi-static traffic pattern are associated with different periodicities.

14. The method of claim 1, further comprising:

determining a cancellation of a transmission during a subset of the first semi-static traffic pattern; and transmitting, to the third UE of the one or more UEs, a second indication of adjusted parameters associated with the second semi-static traffic pattern based at least in part on determining the cancellation of the transmission.

15. The method of claim 14, wherein the adjusted parameters comprise at least one of a beam, a modulation and coding scheme, a transmit power, a rank indicator, a precoder, or a combination thereof.

16. The method of claim 1, wherein the first UE comprises a full-duplex capable UE and the communication between the first UE and the third UE comprises a full-duplex communication.

17. A method for wireless communications, comprising:

receiving, from a first user equipment (UE) and at a third UE, a broadcast or a multicast of an indication of a first semi-static traffic pattern between the first UE and a second UE, wherein the first semi-static traffic pattern indicates a pattern for transmission or reception between the first UE and the second UE using a beam pair during a time period;

transmitting, to the first UE, a response indicating a second semi-static traffic pattern corresponding to the first semi-static traffic pattern during the time period; and receiving, from the first UE, an indication of selection of the second semi-static traffic pattern for communication between the first UE and the third UE during the time period.

18. The method of claim 17, further comprising:

communicating, during the time period, with the first UE according to the second semi-static traffic pattern based at least in part on receiving the indication of selection of the second semi-static traffic pattern.

19. The method of claim 17, further comprising:

transmitting, to the first UE, assistance information associated with the second semi-static traffic pattern for the time period, wherein receiving the indication of selection of the second semi-static traffic pattern is based at least in part on the assistance information.

20. The method of claim 19, wherein the assistance information comprises at least one of a traffic periodicity, a traffic priority, a beam identifier associated with a second beam pair, a quality metric associated with the second beam pair, or a combination thereof.

21. The method of claim 17, wherein transmitting the response further comprises:
   transmitting, to the first UE, the response indicating the second semi-static traffic pattern corresponding to the first semi-static traffic pattern during a first portion of the time period.

22. The method of claim 17, further comprising:
   receiving, from the first UE, a second indication of adjusted parameters associated with the second semi-static traffic pattern based at least in part on a cancellation of a transmission during a subset of the first semi-static traffic pattern.

23. The method of claim 22, wherein the adjusted parameters comprise at least one of a beam, a modulation and coding scheme, a transmit power, a rank indicator, a precoder, or a combination thereof.

24. The method of claim 17, wherein the first UE comprises a full-duplex capable UE and the communication between the first UE and the third UE comprises a full-duplex communication.

25. An apparatus for wireless communications at a first user equipment (UE), comprising:
   at least one processor;
   memory coupled with the at least one processor; and
   instructions stored in the memory and executable by the at least one processor to cause the apparatus to:
      transmit, to a set of UEs, an indication of a first semi-static traffic pattern between the first UE and a second UE, wherein the first semi-static traffic pattern indicates a pattern for transmission or reception between the first UE and the second UE using a beam pair during a time period;
      receive, from one or more UEs of the set of UEs, a response indicating one or more semi-static traffic patterns for the time period, the one or more semi-static traffic patterns corresponding to the first semi-static traffic pattern during the time period; and
      transmit, to a third UE of the one or more UEs, an indication of selection of a second semi-static traffic pattern for communication between the first UE and the third UE during the time period.

26. The apparatus of claim 25, wherein the instructions to transmit the indication of the first semi-static traffic pattern are further executable by the at least one processor to cause the apparatus to:
   broadcasting, to the set of UEs, the indication of the first semi-static traffic pattern between the first UE and the second UE.

27. The apparatus of claim 25, wherein the instructions to transmit the indication of the first semi-static traffic pattern are further executable by the at least one processor to cause the apparatus to:
   multicasting, to the set of UEs, the indication of the first semi-static traffic pattern between the first UE and the second UE.

28. An apparatus for wireless communications, comprising:
   at least one processor;
   memory coupled with the at least one processor; and
   instructions stored in the memory and executable by the at least one processor to cause the apparatus to:
      receive, from a first user equipment (UE) and at a third UE, a broadcast or a multicast of an indication of a first semi-static traffic pattern between the first UE and a second UE, wherein the first semi-static traffic pattern indicates a pattern for transmission or reception between the first UE and the second UE using a beam pair during a time period;
      transmit, to the first UE, a response indicating a second semi-static traffic pattern corresponding to the first semi-static traffic pattern during the time period; and
      receive, from the first UE, an indication of selection of the second semi-static traffic pattern for communication between the first UE and the third UE during the time period.

* * * * *